US012170779B2

(12) United States Patent
Cricri et al.

(10) Patent No.: US 12,170,779 B2
(45) Date of Patent: Dec. 17, 2024

(54) TRAINING A DATA CODING SYSTEM COMPRISING A FEATURE EXTRACTOR NEURAL NETWORK

(71) Applicant: Nokia Technologies Oy, Espoo (FI)

(72) Inventors: Francesco Cricri, Tampere (FI); Nam Le, Tampere (FI); Hamed Rezazadegan Tavakoli, Espoo (FI); Honglei Zhang, Tampere (FI); Miska Matias Hannuksela, Tampere (FI); Emre Baris Aksu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 62 days.

(21) Appl. No.: 17/917,153

(22) PCT Filed: Mar. 30, 2021

(86) PCT No.: PCT/FI2021/050227
§ 371 (c)(1),
(2) Date: Oct. 5, 2022

(87) PCT Pub. No.: WO2021/205065
PCT Pub. Date: Oct. 14, 2021

(65) Prior Publication Data
US 2023/0164336 A1 May 25, 2023

(30) Foreign Application Priority Data

Apr. 9, 2020 (FI) ..................................... 20205380

(51) Int. Cl.
*H04N 19/146* (2014.01)
*G06N 3/0455* (2023.01)
(Continued)

(52) U.S. Cl.
CPC ......... *H04N 19/146* (2014.11); *G06N 3/0455* (2023.01); *G06N 3/084* (2013.01);
(Continued)

(58) Field of Classification Search
CPC .... H04N 19/146; H04N 19/192; H04N 19/42; G06V 10/454; G06V 10/82; G06N 3/0455; G06N 3/084
(Continued)

(56) References Cited

U.S. PATENT DOCUMENTS 11,604,941 B1 * 3/2023 Hester .................... G06V 10/82
11,604,993 B1 * 3/2023 Tan ....................... G06N 3/0495
(Continued)

FOREIGN PATENT DOCUMENTS

EP 3633990 A1 4/2020

OTHER PUBLICATIONS

Aytekin, C. et al., "Compressibility Loss for Neural Network Weights," Nokia Technologies.

*Primary Examiner* — Dominic D Saltarelli
(74) *Attorney, Agent, or Firm* — Harrington & Smith

(57) ABSTRACT

Example embodiments provide a system for training a data coding pipeline including a feature extractor neural network, an encoder neural network, and a decoder neural network configured to reconstruct input data based on encoded features. A plurality of losses corresponding to different tasks may be determined for the coding pipeline. Tasks may be performed based on an output of the coding pipeline. A weight update may be determined for at least a subset of the coding pipeline based on the plurality of losses. The weight update may be configured to reduce a number of iterations for fine-tuning the coding pipeline for one of the tasks. This enables faster adaptation of the coding pipeline for one of the tasks after deployment of the coding pipeline. Apparatuses, methods, and computer programs are disclosed. Apparatuses, methods, and computer programs are disclosed.

20 Claims, 12 Drawing Sheets

(51) Int. Cl.
  *G06N 3/084* (2023.01)
  *G06V 10/44* (2022.01)
  *G06V 10/82* (2022.01)
  *H04N 19/192* (2014.01)
  *H04N 19/42* (2014.01)

(52) U.S. Cl.
  CPC ............ *G06V 10/454* (2022.01); *G06V 10/82* (2022.01); *H04N 19/192* (2014.11); *H04N 19/42* (2014.11)

(58) Field of Classification Search
  USPC ..................................................... 375/240.08
  See application file for complete search history.

(56) References Cited

U.S. PATENT DOCUMENTS

| | | | |
|---|---|---|---|
| 11,816,185 B1* | 11/2023 | Roth | G06N 3/08 |
| 2016/0203525 A1* | 7/2016 | Hara | G06Q 30/0271 |
| | | | 705/14.67 |
| 2019/0244108 A1 | 8/2019 | Meyerson et al. | |
| 2020/0069973 A1 | 3/2020 | Lou et al. | |

* cited by examiner

TRAINING A DATA CODING SYSTEM COMPRISING A FEATURE EXTRACTOR NEURAL NETWORK

CROSS REFERENCE TO RELATED APPLICATION

This patent application is a U.S. National Stage application of International Patent Application Number PCT/FI2021/050227 filed Mar. 30, 2021, which is hereby incorporated by reference in its entirety, and claims priority to FI 20205380 filed Apr. 9, 2020.

TECHNICAL FIELD

The present application generally relates to encoding and decoding of data for different types of applications. In particular, some example embodiments of the present application relate to encoding and/or decoding of video data for machine learning related tasks or other non-human purposes.

BACKGROUND

Machine learning (ML) or other automated processes may be utilized for different applications in different types of devices, such as for example mobile phones. Example applications include compression and analysis of data, such as for example image data, video data, audio data, speech data, or text data. An encoder may be configured to transform input data into a compressed representation suitable for storage or transmission. A decoder may be configured to reconstruct the data based on the compressed representation. Subsequently a machine, such as for example a neural network, may perform a task based on the reconstructed data.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments improve training of a data coding pipeline. This may be achieved by the features of the independent claims. Further implementation forms are provided in the dependent claims, the description, and the drawings.

According to an aspect, an apparatus comprises at least one processor; and at least one memory including computer program code; the at least one memory and the computer program code configured to, with the at least one processor, cause the apparatus at least to: obtain a data coding pipeline comprising a feature extractor neural network configured to extract features from input data, an encoder neural network configured to encode the extracted features, and a decoder neural network configured to reconstruct the input data based on output of the encoder neural network; determine a plurality of losses for the coding pipeline, the plurality of losses corresponding to at least a plurality of tasks; determine a weight update for at least a subset of the coding pipeline based on the plurality of losses, wherein the weight update is configured to reduce a number of iterations for fine-tuning the coding pipeline for at least one of the plurality of tasks; and update at least the subset of the coding pipeline based on the weight update.

According to an aspect, a method comprises obtaining a data coding pipeline comprising a feature extractor neural network configured to extract features from input data, an encoder neural network configured to encode the extracted features, and a decoder neural network configured to reconstruct the input data based on output of the encoder neural network; determining a plurality of losses for the coding pipeline, the plurality of losses corresponding to at least a plurality of tasks; determining a weight update for at least a subset of the coding pipeline based on the plurality of losses, wherein the weight update is configured to reduce a number of iterations for fine-tuning the coding pipeline for at least one of the plurality of tasks; and updating at least the subset of the coding pipeline based on the weight update.

According to an aspect, a computer program is configured, when executed by a processor, to cause an apparatus at least to: obtain a data coding pipeline comprising a feature extractor neural network configured to extract features from input data, an encoder neural network configured to encode the extracted features, and a decoder neural network configured to reconstruct the input data based on output of the encoder neural network; determine a plurality of losses for the coding pipeline, the plurality of losses corresponding to at least a plurality of tasks; determine a weight update for at least a subset of the coding pipeline based on the plurality of losses, wherein the weight update is configured to reduce a number of iterations for fine-tuning the coding pipeline for at least one of the plurality of tasks; and update at least the subset of the coding pipeline based on the weight update.

According to an aspect, an apparatus comprises means for obtaining a data coding pipeline comprising a feature extractor neural network configured to extract features from input data, an encoder neural network configured to encode the extracted features, and a decoder neural network configured to reconstruct the input data based on output of the encoder neural network; means for determining a plurality of losses for the coding pipeline, the plurality of losses corresponding to at least a plurality of tasks; means for determining a weight update for at least a subset of the coding pipeline based on the plurality of losses, wherein the weight update is configured to reduce a number of iterations for fine-tuning the coding pipeline for at least one of the plurality of tasks; and means for updating at least the subset of the coding pipeline based on the weight update.

According to an aspect, an apparatus comprises at least one processor; and at least one memory including computer program code; the at least one memory and the computer program code configured to, with the at least one processor, cause the apparatus at least to: receive encoded features of input data; receive at least one encoded portion of the input data; decode the at least one encoded portion of the input data; extract features from the decoded portion of the input data by a feature extractor neural network; determine, by a decoder, decoded features based on the encoded features; perform a plurality of tasks with a plurality of task neural networks based on the decoded features; perform the plurality of tasks with a plurality of reference task neural networks based on the extracted features; determine a plurality of losses based on outputs of the plurality of task neural networks and outputs of the plurality of reference task neural networks; determine a weight update based on the plurality of losses; and fine-tune the feature extractor neural network based on the weight update.

According to an aspect, a method comprises receiving encoded features of input data; receiving at least one encoded portion of the input data; decoding the at least one encoded portion of the input data; extracting features from the decoded portion of the input data by a feature extractor neural network; determining, by a decoder neural network, decoded features based on the encoded features; performing a plurality of tasks with a plurality of task neural networks based on the decoded features; performing the plurality of tasks with a plurality of reference task neural networks based on the extracted features; determining a plurality of losses based on outputs of the plurality of task neural networks and outputs of the plurality of reference task neural networks; determining a weight update based on the plurality of losses; and fine-tuning the feature extractor neural network based on the weight update.

According to an aspect, a computer program is configured, when executed by a processor, to cause an apparatus at least to: receive encoded features of input data; receive at least one encoded portion of the input data; decode the at least one encoded portion of the input data; extract features from the decoded portion of the input data by a feature extractor neural network; determine, by a decoder neural network, decoded features based on the encoded features; perform a plurality of tasks with a plurality of task neural networks based on the decoded features; perform the plurality of tasks with a plurality of reference task neural networks based on the extracted features; determine a plurality of losses based on outputs of the plurality of task neural networks and outputs of the plurality of reference task neural networks; determine a weight update based on the plurality of losses; and fine-tune the feature extractor neural network based on the weight update.

According to an aspect, an apparatus comprises means for receiving encoded features of input data; means for receiving at least one encoded portion of the input data; means for decoding the at least one encoded portion of the input data; means for extracting features from the decoded portion of the input data by a feature extractor neural network; means for determining, by a decoder neural network, decoded features based on the encoded features; means for performing a plurality of tasks with a plurality of task neural networks based on the decoded features; means for performing the plurality of tasks with a plurality of reference task neural networks based on the extracted features; means for determining a plurality of losses based on outputs of the plurality of task neural networks and outputs of the plurality of reference task neural networks; means for determining a weight update based on the plurality of losses; and means for fine-tuning the feature extractor neural network based on the weight update.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to explain the example embodiments. In the drawings.

Like references are used to designate like parts in the accompanying drawings.

DETAILED DESCRIPTION

Figure 1:
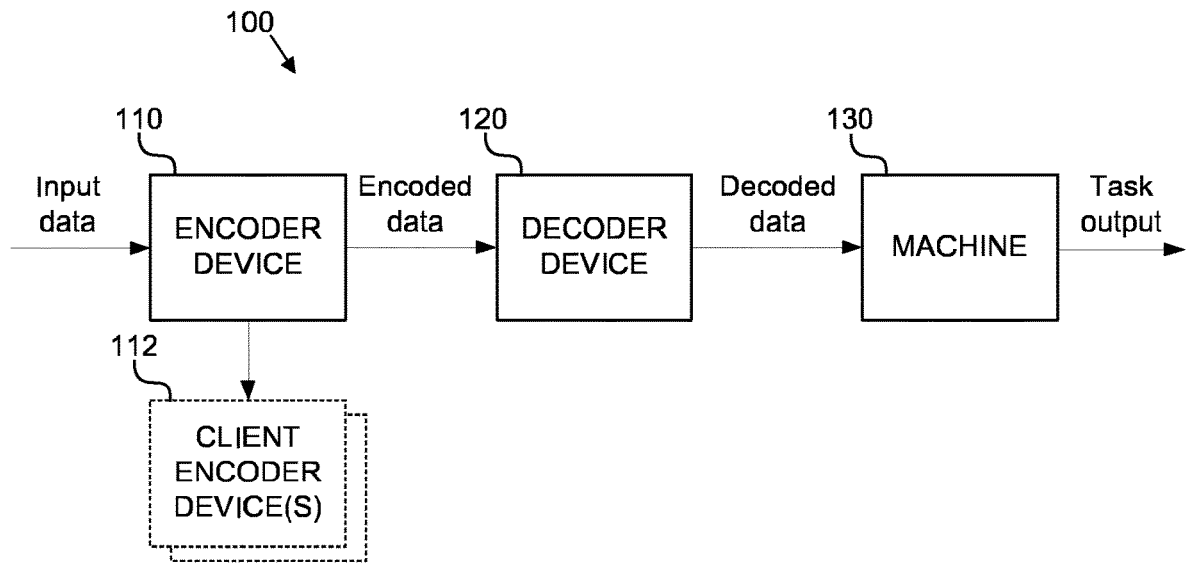
FIG. 1 illustrates an example of a data coding system comprising an encoder device, a decoder device, and a machine configured to perform a task, according to an example embodiment.

Reference will now be made in detail to example embodiments, examples of which are illustrated in the accompanying drawings. The detailed description provided below in connection with the appended drawings is intended as a description of the present examples and is not intended to represent the only forms in which the present examples may be constructed or utilized. The description sets forth the functions of the example and a possible sequence of steps for constructing and operating the example. However, the same or equivalent functions and sequences may be accomplished by different examples.

Reducing distortion in image and video compression may be intended for increasing human perceptual quality, because the human user may be considered as the consumer for the decompressed data. However, with the advent of machine learning, for example deep learning, machines operating as autonomous agents may be configured to analyze data and even make decisions without human intervention. Examples of such analysis tasks include object detection, scene classification, semantic segmentation, video event detection, anomaly detection, pedestrian tracking, etc. Example use cases and applications include self-driving cars, video surveillance cameras and public safety, smart sensor networks, smart TV and smart advertisement, person re-identification, smart traffic monitoring, drones, etc. Since decoded data is more likely to be consumed by machines, it may be desirable to apply other quality metrics in addition or alternative to human perceptual quality, when considering media compression for inter-machine communication. Also, dedicated algorithms for compressing and decompressing data for machine consumption may be different from algorithms for compressing and decompressing data for human consumption. The set of tools and concepts for compressing and decompressing data for machine consumption may be referred to as video coding for machines (VCM).

Furthermore, a decoder device may comprise or have access to multiple machines, for example machine learning (ML) functions such as neural networks (NN). ML functions may be used in a certain combination with or without other machines, such as for example non-ML functions including, but not limited to, user related functions. Execution of the functions may be controlled by an orchestrator sub-system, which may be for example configured to determine an order of execution among functions. Multiple machines may be used for example in succession, based on the output of the previously used machine, and/or in parallel. For example, a decompressed video may be analyzed by one machine (e.g. a first neural network) for detecting pedestrians, by another machine (a second neural network) for detecting cars, and by another machine (a third neural network) for estimating depth of pixels in the video frames.

A neural network is one type of a machine, but it is appreciated that any process or algorithm, either learned from data or not, which analyzes or processes data for a certain task may be considered as a machine. Furthermore, receiver or decoder side may refer to a physical or abstract entity or device, which contains one or more machines and which may be configured to run the machine(s) on a decoded video representation. The video may have been encoded by another physical or abstract entity or device, which may be referred to as transmitter or encoder side. The encoder and decoder may be also embodied in a single device.

According to an example embodiment, a data coding pipeline may comprise a feature extractor neural network, an encoder neural network, and a decoder neural network configured to reconstruct input data based on encoded features. A plurality of losses corresponding to different tasks may be determined for the coding pipeline. Tasks may be performed based on an output of the coding pipeline. A weight update may be determined for at least a subset of the coding pipeline based on the plurality of losses. The weight update may be configured to reduce a number of iterations for fine-tuning the coding pipeline for one of the tasks. This enables faster adaptation of the coding pipeline for one of the tasks after deployment of the coding pipeline.

FIG. 1 illustrates an example of a data coding system 100 comprising an encoder device 110, a decoder device 120, and a machine 130, according to an example embodiment. Encoder device 110 may be configured to receive input data and produce encoded data, which may comprise an encoded representation of the input data. The encoded data may for example comprise a compressed version of the input data.

The encoded data may be delivered to decoder device 120 by various means, for example over a communication network. Therefore, the encoder device 110 may comprise a transmitter. The decoder device 120 may comprise a receiver. Alternatively, encoded data may be stored on a storage medium such as for example a hard drive or an external memory and retrieved from the memory by decoder device 120. The decoder device 120 may be configured to reconstruct the input data based on the encoded data received from the encoder device 110, or otherwise accessed by decoder device 120. As a result, decoded data may be output by the decoder device 120. The system may further comprise at least one client encoder device 112, which may be configured to encode data under control and/or based on encoding configuration data received from encoder device 110, which may be configured to act as a master encoder device for the at least one client encoder device. The client encoder device 112 may receive input data and provide encoded data to another decoder device (not shown).

According to an example embodiment, encoder device 110 and decoder device 120 may be embodied as separate devices. It is however possible that a single device comprises one or more encoders and one or more decoders, for example as dedicated software and/or hardware components. Encoder device 110 may be also referred to as a video encoder or video compressor. Decoder device 120 may be also referred to as a video decoder or video decompressor. As will be further described below, an encoder may be implemented as a neural encoder comprising an encoder neural network. A decoder may be implemented as a neural decoder comprising a decoder neural network. Even though some example embodiments are directed to video encoders and video decoders, it is appreciated that example embodiments may be also applied to other type of data, a such as for example image data, audio data, speech data, or text data.

Figure 2:
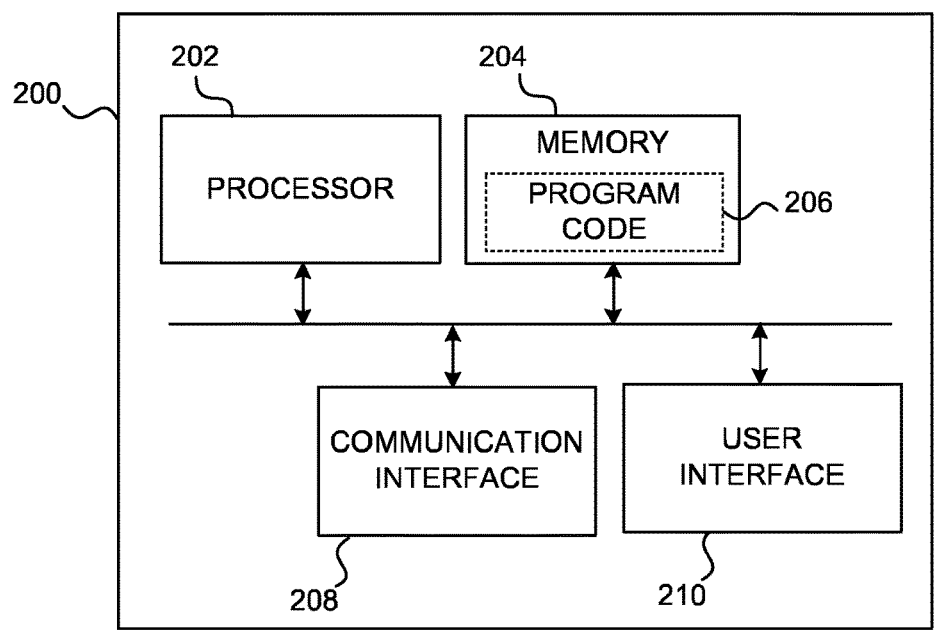
FIG. 2 illustrates an example of an apparatus configured to practice one or more example embodiments.

FIG. 2 illustrates an example of an apparatus configured to practice one or more example embodiments, for example encoder device 110 or decoder device 120. Apparatus 200 may comprise at least one processor 202. The at least one processor may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus may further comprise at least one memory 204. The memory may be configured to store, for example, computer program code or the like, for example operating system software and application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 200 may further comprise communication interface 208 configured to enable apparatus 200 to transmit and/or receive information, for example compressed video data to/from other devices. The communication interface may be configured to provide at least one wireless radio connection, such as for example a 3GPP mobile broadband connection (e.g. 3G, 4G, 5G); a wireless local area network (WLAN) connection such as for example standardized by IEEE 802.11 series or Wi-Fi alliance; a short range wireless network connection such as for example a Bluetooth, NFC (near-field communication), or RFID connection; a local wired connection such as for example a local area network (LAN) connection or a universal serial bus (USB) connection, or the like; or a wired Internet connection.

Apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When the apparatus is configured to implement some functionality, some component and/or components of the apparatus 200, such as for example the at least one processor 202 and/or the memory 204, may be configured to implement this functionality. Furthermore, when the at least one processor 202 is configured to implement some functionality, this functionality may be implemented using program code 206 comprised, for example, in the memory 204.

The functionality described herein may be performed, at least in part, by one or more computer program product components such as software components. According to an example embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 200 may comprise means for performing at least one method described herein. In one example, the means comprises the at least one processor 202, the at least one memory 204 including program code 206, the at least one memory 204 and the program code 206 configured to, with the at least one processor 202, cause the apparatus 200 to perform the method(s).

Apparatus 200 may comprise a computing device such as for example mobile phone, a tablet computer, a laptop, an internet of things (IoT) device, or the like. Examples of IoT devices include, but are not limited to, consumer electronics, wearables, and smart home appliances. In one example, apparatus 200 may comprise a vehicle such as for example a car. Although apparatus 200 is illustrated as a single device it appreciated that, wherever applicable, functions of apparatus 200 may be distributed to a plurality of devices, for example to implement example embodiments as a cloud computing service.

Figure 3:
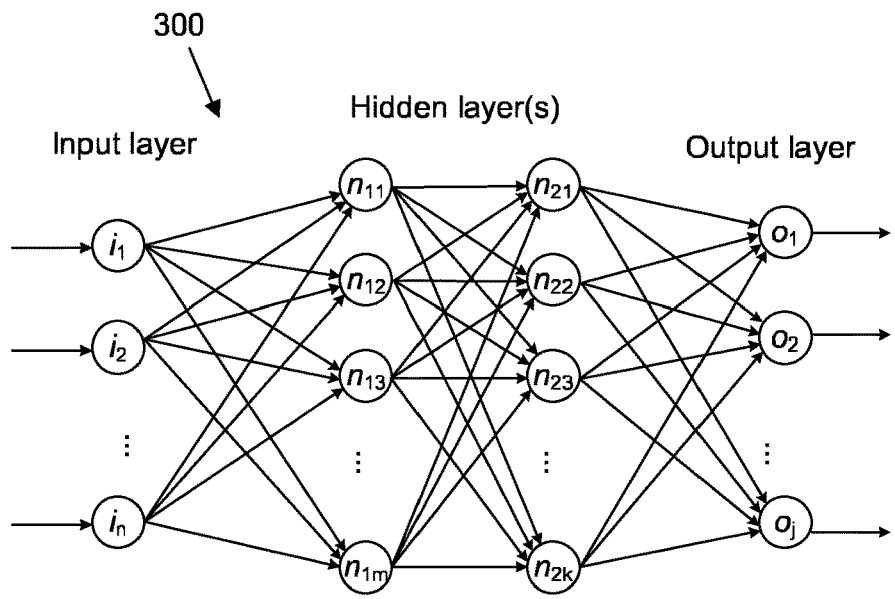
FIG. 3 illustrates an example of a neural network, according to an example embodiment.

FIG. 3 illustrates an example of a neural network, according to an example embodiment. A neural network may comprise a computation graph with several layers of computation. For example, neural network 300 may comprise an input layer, one or more hidden layers, and an output layer. Nodes of the input layer, $i_1$ to $i_n$, may be connected to one or more of the m nodes of the first hidden layer, $n_{11}$ to $n_{1m}$. Nodes of the first hidden layer may be connected to one or more of the k nodes of the second hidden layer, $n_{21}$ to $n_{2k}$. It is appreciated that even though the example neural network of FIG. 3 illustrates two hidden layers, a neural network may apply any number and any type of hidden layers. Neural network 400 may further comprise an output layer. Nodes of the last hidden layer, in the example of FIG. 3 the nodes of second hidden layer, may be connected to one or more nodes of the output layer, $o_1$ to $o_j$. It is noted that the number of nodes may be different for each layer of the network. A node may be also referred to as a neuron, a computation unit, or an elementary computation unit. Terms neural network, neural net, network, and model may be used interchangeably. Weights of the neural network may be referred to as learnable parameters or simply as parameters. In the example of FIG. 3, one or more of the layers may be fully connected layers, for example layers where each node is connected to every node of a previous layer.

Two example architectures of neural networks include feed-forward and recurrent architectures. Feed-forward neural networks are such that there is no feedback loop. Each layer takes input from one or more previous layers and provides its output as the input for one or more of the subsequent layers. Also, units inside certain layers may take input from units in one or more of preceding layers and provide output to one or more of following layers.

Initial layers, for example layers close to the input data, may extract semantically low-level features. In an example image or video data, the low-level features may correspond to edges and textures in images or video frames. Intermediate and final layers may extract more high-level features. After the feature extraction layers there may be one or more layers performing a certain task, such as classification, semantic segmentation, object detection, denoising, style transfer, super-resolution, or the like.

In recurrent neural networks there is a feedback loop from one or more nodes of one or more subsequent layers. This causes the network to become becomes stateful. For example, the network may be able to memorize information or a state.

Figure 4:
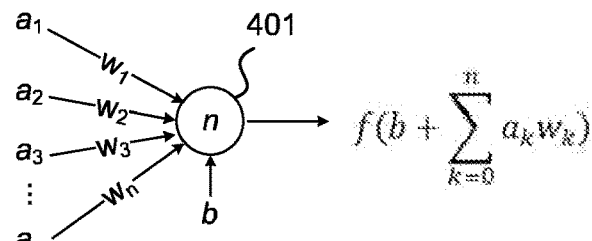
FIG. 4 illustrates an example of an elementary computation unit, according to an example embodiment.

FIG. 4 illustrates an example of an elementary computation unit, according to an example embodiment. The elementary computation unit may comprise a node 401, which may be configured to receive one or more inputs, $a_1$ to $a_n$, from one or more nodes of one or more previous layers and compute an output based on the input values received. The node 401 may also receive feedback from one or more nodes of one or more subsequent layers. Inputs may be associated with parameters to adjust the influence of a particular input to the output. For example weights $w_1$ to $w_n$ associated with the inputs $a_1$ to $a_n$ may be used to multiply the input values $a_1$ to $a_n$. The node 401 may be further configured combine the inputs to an output, or an activation. For example, the node 401 may be configured to sum the modified input values. A bias or offset b may be also applied to add a constant to the combination of modified inputs. Weights and biases may be learnable parameters. For example, when the neural network is trained for a particular task, the values of the weights and biases associated with different inputs and different nodes may be updated such that an error associated with performing the task is reduced to an acceptable level.

Furthermore, an activation function f( ) may be applied to control when and how the node 401 provides the output. Activation function may be for example a non-linear function that is substantially linear in the region of zero but limits the output of the node when the input increases or decreases. Examples of activation functions include, but are not limited to, a step function, a sigmoid function, a tank function, a ReLu (rectified linear unit) function. The output may be provided to nodes of one or more following layers of the network, and/or to one or more nodes of one or more previous layers of the network.

A forward propagation or a forward pass may comprise feeding a set of input data through the layers of the neural network 400 and producing an output. During this process the weights and biases of the neural network 400 affect the activations of individual nodes and thereby the output provided by the output layer.

One property of neural networks and other machine learning tools is that they are able to learn properties from input data, for example in supervised way or in unsupervised way. Learning may be based on teaching the network by a training algorithm or based on a meta-level neural network providing a training signal.

In general, a training algorithm may include changing some properties of the neural network such that its output becomes as close as possible to a desired output. For example, in the case of classification of objects in images or video frames, the output of the neural network may be used to derive a class or category index, which indicates the class or category that the object in the input data belongs to. Training may happen by minimizing or decreasing the output's error, also referred to as the loss.

During training the generated or predicted output may be compared to a desired output, for example ground-truth data provided for training purposes, to compute an error value. The error may be calculated based on a loss function. Updating the neural network may be then based on calculating a derivative with respect to learnable parameters of the network. This may be done for example using a back-propagation algorithm that determines gradients for each layer starting from the final layer of the network until gradients for the learnable parameters have been obtained. Parameters of each layer are updated accordingly such that the loss is iteratively decreased. Examples of losses include mean squared error, cross-entropy, or the like. In deep learning, training may comprise an iterative process, where at each iteration the algorithm modifies parameters of the neural network to make a gradual improvement of the network's output, that is, to gradually decrease the loss.

Deep neural networks may suffer from vanishing gradients, which may cause updates to the learnable parameters be so small that training the neural network becomes slow or stops completely. For example, each weight associated with the nodes of the layers of the neural network may receive an update that is proportional to a partial derivative of the loss function. If the number of layers is high, the update may not cause any significant change in the weights and thereby also the output of the neural network.

Training phase of the neural network may be ended after reaching an acceptable error level. In inference phase the trained neural network may be applied for a particular task, for example, to provide a classification of an unseen image to one of a plurality of classes based on content of an input image.

Training a neural network may be seen as an optimization process, but the final goal may be different from a typical goal of optimization. In optimization, the goal may be to minimize a functional. In machine learning, a goal of the optimization or training process is to make the model learn the properties of the data distribution from a limited training dataset. In other words, the goal is to learn to use a limited training dataset in order to learn to generalize to previously unseen data, that is, data which was not used for training the model. This is usually referred to as generalization.

In practice, data may be split into at least two sets, a training data set and a validation data set. The training data set may be used for training the network, for example to modify its learnable parameters in order to minimize the loss. The validation data set may be used for checking performance of the network on data which was not used to minimize the loss as an indication of the final performance of the model. In particular, the errors on the training set and on the validation data set may monitored during the training process to understand the following issues: 1) if the network is learning at all—in this case, the training data set error should decrease, otherwise the model is in the regime of underfitting; 2) if the network is learning to generalize—in this case, also the validation set error should decrease and not be much higher than the training data set error. If the training data set error is low, but the validation data set error is much higher than the training data set error, or it does not decrease, or it even increases, the model is in the regime of overfitting. This means that the model has just memorized properties of the training data set and performs well on that set, but performs poorly on a set not used for tuning its parameters.

Figure 5:
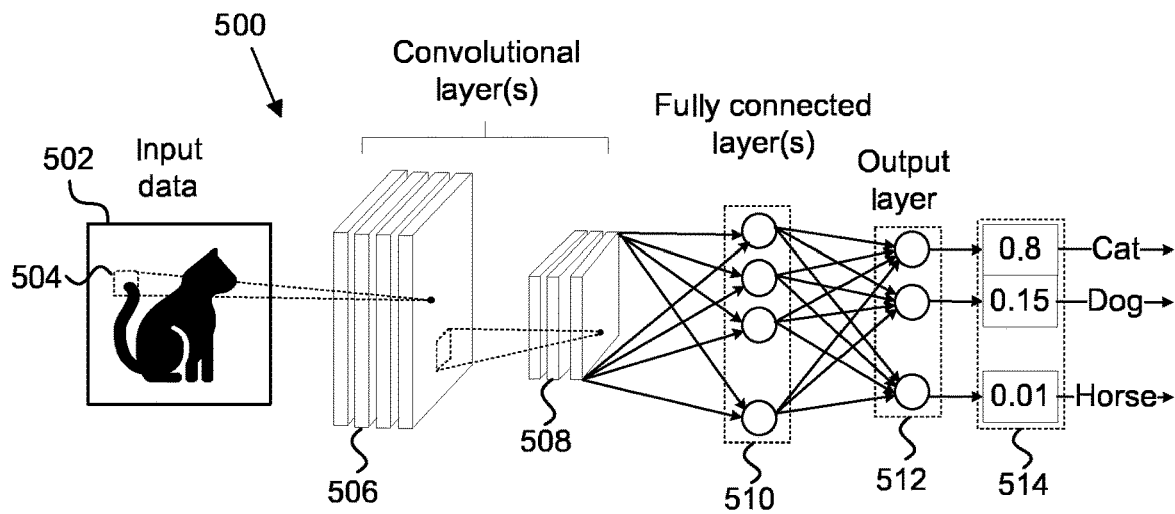
FIG. 5 illustrates an example of a convolutional classification neural network, according to an example embodiment.

FIG. 5 illustrates an example of a convolutional classification neural network 500. A convolutional neural network 500 comprises at least one convolutional layer. A convolutional layer performs convolutional operations to extract information from input data, for example image 502, to form a plurality of feature maps 506. A feature map may be generated by applying a filter or a kernel to a subset of input data, for example block 504 in image 502, and sliding the filter through the input data to obtain a value for each element of the feature map. The filter may comprise a matrix or a tensor, which may be for example multiplied with the input data to extract features corresponding to that filter. A plurality of feature maps may be generated based on applying a plurality of filters. A further convolutional layer may take as input the feature maps from a previous layer and apply the same filtering principle on the feature maps 506 to generate another set of feature maps 508. Weights of the filters may be learnable parameters and they may be updated during a training phase, similar to parameters of neural network 300. Similar to node 501, an activation function may be applied to the output of the filter(s). The convolutional neural network may further comprise one or more other type of layers such as for example fully connected layers 510 after and/or between the convolutional layers. An output may be provided by an output layer 512, which in the example of FIG. 5 comprises a classification layer. For a classification task the outputs may comprise approximations of probability distributions, for example an N-dimensional array 514, where N is the number of classes, and where the sum of the values in the array is 1. Each element of the array 514 may indicate a probability of the input image belonging to a particular class, such as for example the classes of cats, dogs, horses, or the like. Elements of the array 514 may be called bins. The output may be represented either as one-hot representation where only one class bin is one and others class bins are zero, or as soft labels where the array comprises a probability distribution instead of a one-hot representation. In the latter case, all bins of the output array 514 may have a value different from zero, as illustrated in FIG. 5.

In addition to implementing the machine 130, neural networks may be also used at encoder device 110 or decoder 120. Neural networks may be used either to perform the whole encoding or decoding process or to perform some steps of the encoding or decoding process. The former option may be referred to as end-to-end learned compression. Learned compression may be for example based on an auto-encoder structure that is trained to encode and decode video data.

Figure 6:
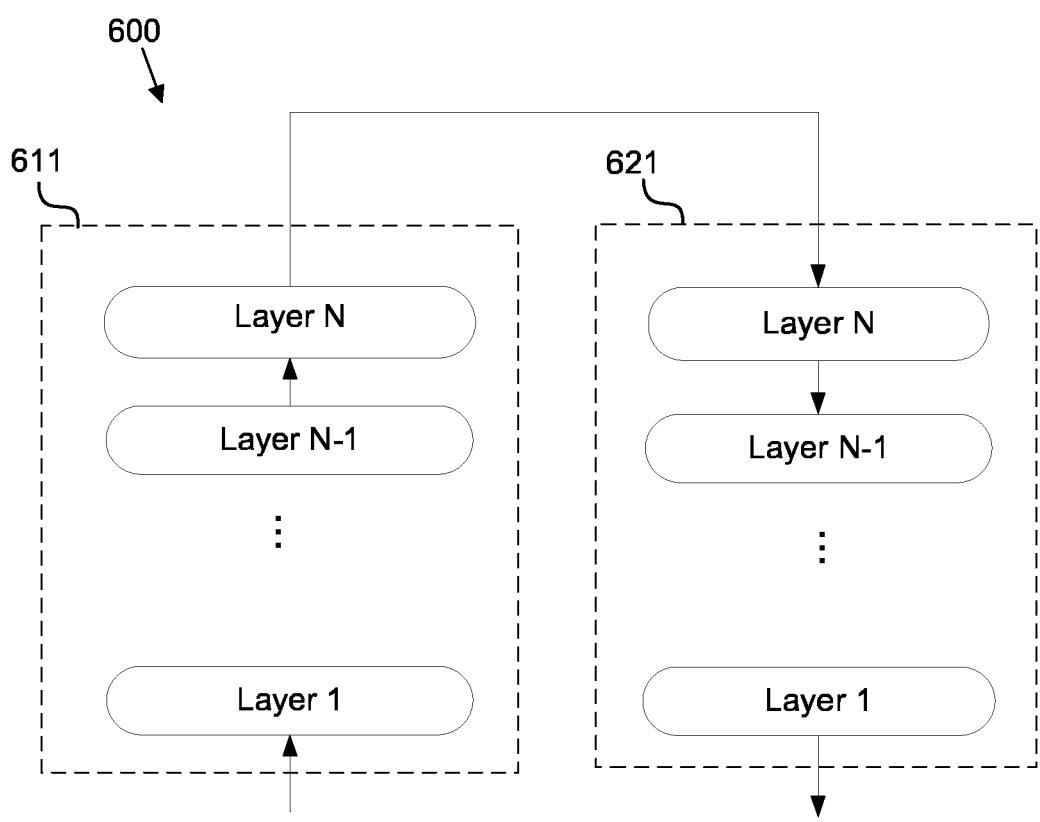
FIG. 6 illustrates an example of an auto-encoder comprising an encoder neural network and a decoder neural network, according to an example embodiment.

FIG. 6 illustrates an example of an auto-encoder comprising an encoder neural network and a decoder neural network, according to an example embodiment. An auto-encoder is a neural network comprising an encoder network 611, which may be configured to compress data or make the input data to be more compressible at its output (for example by having lower entropy), and a decoder network 621, which may take the compressed data (e.g., the data output by the encoder network 611 or data output by a step performed after the encoder network 611) and output a reconstruction of the original data, possibly with some loss. It is noted that example embodiments may be applied to various other type of neural networks configured to be applied in encoding or decoding process and the auto-encoder 600 is provided only as an example.

The auto-encoder 600 may be trained based on a training dataset. For each training iteration, a subset of data may be sampled from the training dataset and input to the encoder network 611. The output of the encoder 611 may be subject to further processing steps, such as for example binarization, quantization, and/or entropy coding. Finally, the output (also referred to as a code) may be input to the decoder network 621 which reconstructs the original data input to the encoder network 611. The reconstructed data may however differ from the original input data. The difference between the input data and the reconstructed data may be referred to as the loss. However, the auto-encoder pipeline may be also designed in a way that there is no loss in the reconstruction. A loss or error value may be computed by comparing the output of the decoder network 621 to the input of the encoder network 611. The loss value may be computed for example based on a mean-squared error (MSE), a pixel signal-to-noise ratio (PSNR), structural similarity (SSIM), or the like. Such distortion metrics may be inversely proportional to the human visual perception quality.

Another loss function may be used for encouraging the output of the encoder to be more compressible, for example to have low entropy. This loss may be used in addition to the loss measuring the quality of data reconstruction. In general, a plurality of losses may be computed and then added together for example via a linear combination (weighted average) to obtain a combined loss. The combined loss value may be then differentiated with respect to the weights and/or other parameters of the encoder network 611 and decoder network 621. Differentiation may be done for example based on backpropagation, as described above. The obtained gradients may then be used to update or change the parameters (e.g. weights), for example based on a stochastic gradient descent algorithm or any other suitable algorithm. This process may be iterated until a stopping criterion is met. As a result, the neural auto-encoder is trained to compress the input data and to reconstruct original data from the compressed representation. According to an example embodiment, the encoder device 110 may comprise a neural encoder, for example the encoder network part 611 of the auto-encoder 600. According to an example embodiment, the decoder device 120 may comprise a neural decoder, for example the decoder network part 621 of the auto-encoder 600.

Video coding may be alternatively performed by algorithmic video codecs. Examples of algorithmic video codecs include hybrid video codecs, such as for example similar to ITU-T H.263, H.264, H.265, and H.266 standards. Hybrid video encoders may code video information in two phases. Firstly, pixel values in a certain picture area, for example a block, may be predicted for example by motion compensation means or spatial means. Motion compensation may comprise finding and indicating an area in one of the previously coded video frames that corresponds to the block being coded. Applying spatial means may comprise using pixel values around the block to be coded in a specified manner.

Secondly, the prediction error, for example the difference between the predicted block of pixels and the original block of pixels, may be coded. This may be done based on transforming the difference in pixel values using a transform, such as for example discrete cosine transform (DCT) or a variant of DCT, quantizing the coefficients, and entropy coding the quantized coefficients. By varying the fidelity of the quantization process, encoder can control the balance between the accuracy of the pixel representation (picture quality) and size of the resulting coded video representation (file size or transmission bitrate).

Inter prediction, which may also be referred to as temporal prediction, motion compensation, or motion-compensated prediction, exploits temporal redundancy. In inter prediction the sources of prediction are previously decoded pictures.

Intra prediction utilizes the fact that adjacent pixels within the same picture are likely to be correlated. Intra prediction can be performed in spatial or transform domain, which means that either sample values or transform coefficients can be predicted. Intra prediction may be exploited in intra coding, where no inter prediction is applied.

One outcome of the coding procedure may comprise a set of coding parameters, such as motion vectors and quantized transform coefficients. Many parameters can be entropy-coded more efficiently if they are predicted first from spatially or temporally neighbouring parameters. For example, a motion vector may be predicted from spatially adjacent motion vectors and the difference relative to the motion vector predictor may be coded. Prediction of coding parameters and intra prediction may be collectively referred to as in-picture prediction.

A video decoder may reconstruct the output video based on prediction means similar to the encoder to form a predicted representation of the pixel blocks. Reconstruction may be based on motion or spatial information created by the encoder and stored in the compressed representation and prediction error decoding, which may comprise an inverse operation of the prediction error coding to recover the quantized prediction error signal in spatial pixel domain. After applying prediction and prediction error decoding means the decoder may sum up the prediction and prediction error signals, for example pixel values, to form the output video frame. The decoder, and also the encoder, can also apply additional filtering means to improve the quality of the output video before passing it for display and/or storing it as prediction reference for the forthcoming frames in the video sequence.

In video codecs the motion information may be indicated with motion vectors associated with each motion compensated image block. Each of these motion vectors represents displacement of the image block in the picture to be coded or decoded and the prediction source block in one of the previously coded or decoded pictures. In order to represent motion vectors efficiently, the motion vectors may be coded differentially with respect to block specific predicted motion vectors. The predicted motion vectors may be created in a predefined way, for example based on calculating a median of encoded or decoded motion vectors of an adjacent blocks.

Another way to create motion vector predictions may comprise generating a list of candidate predictions from adjacent blocks and/or co-located blocks in temporal reference pictures and signalling the chosen candidate as the motion vector predictor. In addition to predicting the motion vector values, the reference index of previously coded or decoded picture can be predicted. The reference index may be predicted from adjacent blocks and/or or co-located blocks in temporal reference picture.

Moreover, high efficiency video codecs may employ an additional motion information coding or decoding mechanism, often called merging/merge mode, where motion field information, comprising motion vector and corresponding reference picture index for each available reference picture list, is predicted and used without any modification/correction. Similarly, predicting the motion field information may be carried out based on using the motion field information of adjacent blocks and/or co-located blocks in temporal reference pictures and the used motion field information may be signalled among a list of motion field candidate list filled with motion field information of available adjacent/co-located blocks.

The prediction residual after motion compensation may be first transformed with a transform kernel, for example DCT, and then coded. One reason for this is that often there still exists some correlation among the residual and applying the transform may reduce this correlation and enable to provide more efficient coding.

Video encoders may utilize Lagrangian cost functions to find optimal coding modes, for example the desired macroblock mode and associated motion vectors. This kind of cost function may use a weighting factor $\lambda$ to tie together the (exact or estimated) image distortion due to lossy coding methods and the (exact or estimated) amount of information that is required to represent the pixel values in an image area: $C=D+\lambda R$, where C is the Lagrangian cost to be minimized, D is the image distortion, for example mean squared error (MSE) with the mode and motion vectors considered, and R is the number of bits needed to represent the required data to reconstruct the image block in the decoder (including the amount of data to represent the candidate motion vectors).

Neural networks may be used in image and video compression, either to perform the whole compression or decompression process or to perform some steps of the compression or decompression process. When the encoder neural network is used for some step(s), an encoder neural network may be for example configured to perform a step which takes as an input a decorrelated version of the input data, for example an output of a transform such as for example Fourier transform or discrete cosine transform (DCT). The encoder neural network may be for example configured to perform one of the last steps of the encoding process. The encoder neural network may be followed by one or more post-processing steps such as for example binarization, quantization, and/or an arithmetic encoding step, for example a lossless encoder such as an entropy encoder. The decoder neural network may be located at a corresponding position at the decoder and be configured to perform a corresponding inverse function.

Example embodiment provide an encoder and decoder which may be applied for compression and decompression of data to be consumed by machine(s). The decompressed data may also be consumed by humans, either at the same time or at different times with respect to consumption of the decompressed data at the machine(s). A codec may comprise multiple parts, where some parts may be used for compressing or decompressing data for machine consumption, and other parts may be used for compressing or decompressing data for human consumption.

We assume that at least some machines comprise models such as neural networks (e.g. task-NNs), for which it is possible to compute gradients of their output with respect to their input. For example, if the machines comprise parametric models, the gradients may be obtained based on computing the gradients of their output first with respect to their internal parameters and then with respect to their input, for example by using the chain rule for differentiation in mathematics. In the case of neural networks, backpropagation may be used to obtain the gradients of the output of a neural network with respect to its input.

Figure 7:
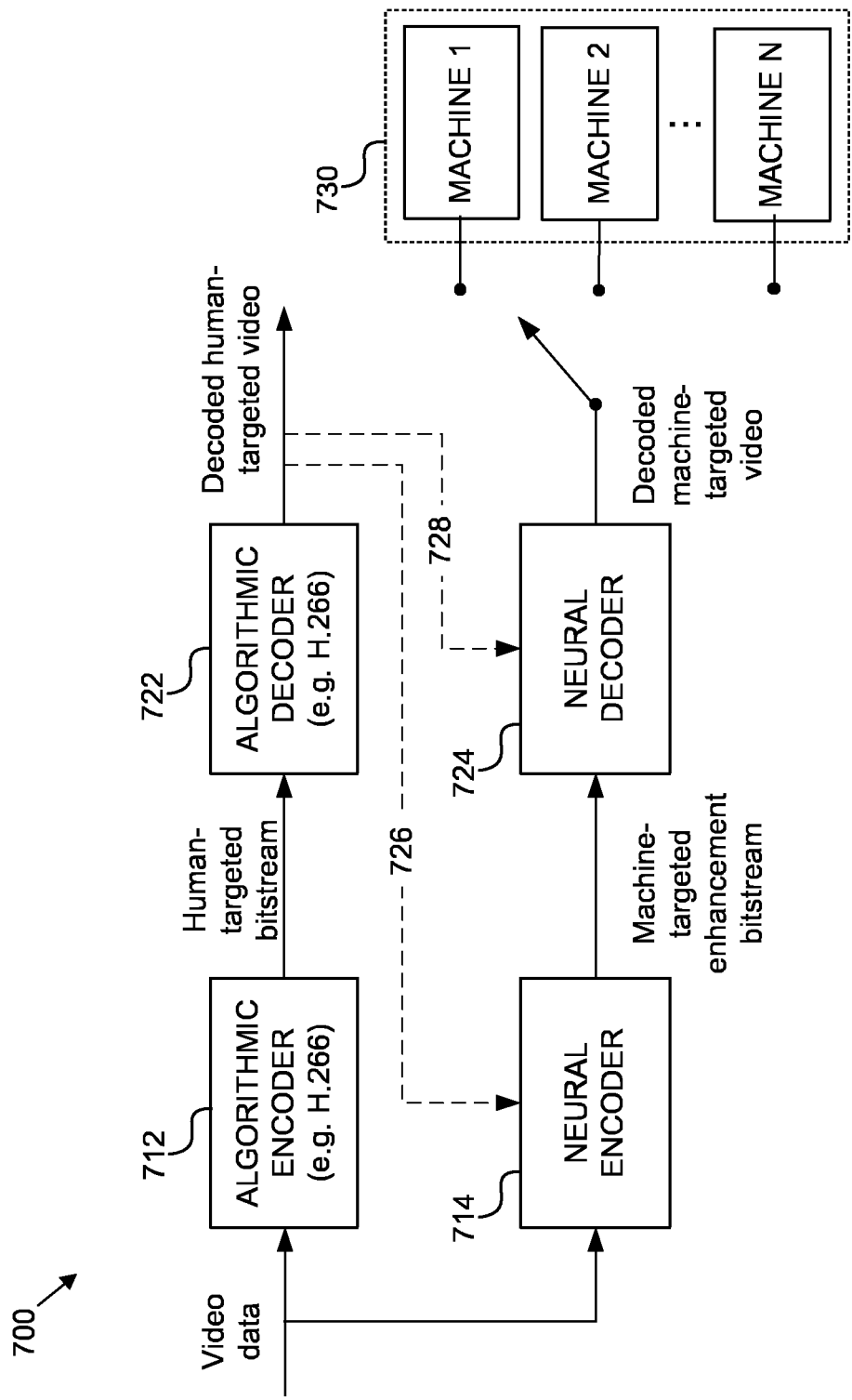
FIG. 7 illustrates an example of a video codec targeted for both machine and human consumption of video, according to an example embodiment.

FIG. 7 illustrates an example of a video codec targeted for both machine and human consumption of video, according to an example embodiment. Video codec 700 may comprise an encoder 712, for example an algorithmic encoder as illustrated in FIG. 7, such as for example according to or based on the H.266 standard. Alternatively, the encoder 712 may comprise a neural network. The encoder 712 may be configured to provide a first bitstream, which may be a human-targeted bitstream. The video codec 700 may further comprise a neural encoder 714, for example the encoder part 611 of the auto-encoder 600. The neural encoder 714 may be configured to provide a second bitstream, which may be a machine-targeted bitstream. The encoder 712 and neural encoder 714 may form or be comprised at an encoder part of the codec 700. The encoder part may further comprise instances of the decoder 722 and/or neural decoder 724.

Video codec 700 may further comprise a decoder 722, which may be an algorithmic decoder as illustrated in FIG. 7, such as for example according to or based on the H.266 standard. Alternatively, the decoder 722 may comprise a neural network. The decoder 722 may be configured to decode the first bitstream, for example to output a decoded human-targeted video. The video codec 700 may further comprise a neural decoder 724, for example the decoder part 621 of the auto-encoder 600. The neural decoder 724 may be configured to decode the second bitstream, for example to output a decoded machine-targeted video to one or more machines 130. The algorithmic decoder 715 and neural decoder 724 may form or be comprised in an decoder part of the codec 700. Alternatively, the encoder and decoder parts of the codec 700 may be embodied separately, for example at different devices or as separate software and/or hardware components. For example, the encoder part may be comprised in the encoder device 110. The decoder part may be comprised in the decoder device 120.

At training phase, the encoder device 110, or other training device, may have access to the decoder 722 and/or the neural decoder 724. For example, feedback 726 may be provided from the decoder 722 to the neural encoder 714. Feedback 728 may be provided from the decoder 722 to the neural decoder 724. Hence, the decoded first bitstream output by the decoder 722 may be provided to the neural encoder 714 and/or to the neural decoder 724.

At inference phase, there may not be feedback from the decoder device 120 to the encoder device 110. However, the encoder device 110 may be embedded with an instance of the decoder 722 and a feedback may be provided internally within the encoder device 110. The feedback 726 may be provided to inform the neural encoder 714 about what information has been already reconstructed at the decoder device 120 side by its decoder 722, and thus to understand what additional information to encode for the machines 730.

At the inference phase, the feedback 728 may be provided within the decoder device 120. The feedback 728 may be applied to provide the neural decoder 724 of the decoder device 120 with information about the already decoded information from the decoder 722 of the decoder device 120, and to combine it with the machine-targeted bitstream to decode the machine targeted video.

It is noted that instead of video data, the above approach may be also applied to featured extracted from video data. Furthermore, the human-targeted video and the machine-targeted video may be processed in either order. It is also possible to apply the encoder 712 and the decoder 722 for machine-targeted video. The neural encoder 714 and the neural decoder 724 may be alternatively used for human-targeted video The one or more machines 130 may comprise one or more machine learning (ML) functions configured to perform one or more machine learning tasks. Examples of machine learning tasks include detecting an object of interest, classifying an object, recognizing identity of an object, or the like. The one or more machines 130 may also comprise one or more non-ML functions such as for example algorithms or other non-learned functions. The non-ML functions 325 may for example include algorithms for performing similar tasks as the machine learning functions. The different machines may be associated with different metrics for encoding or decoding quality and therefore example embodiments provide methods for efficiently training the neural encoder 714 and the neural decoder 724 for particular task(s).

Figure 8:
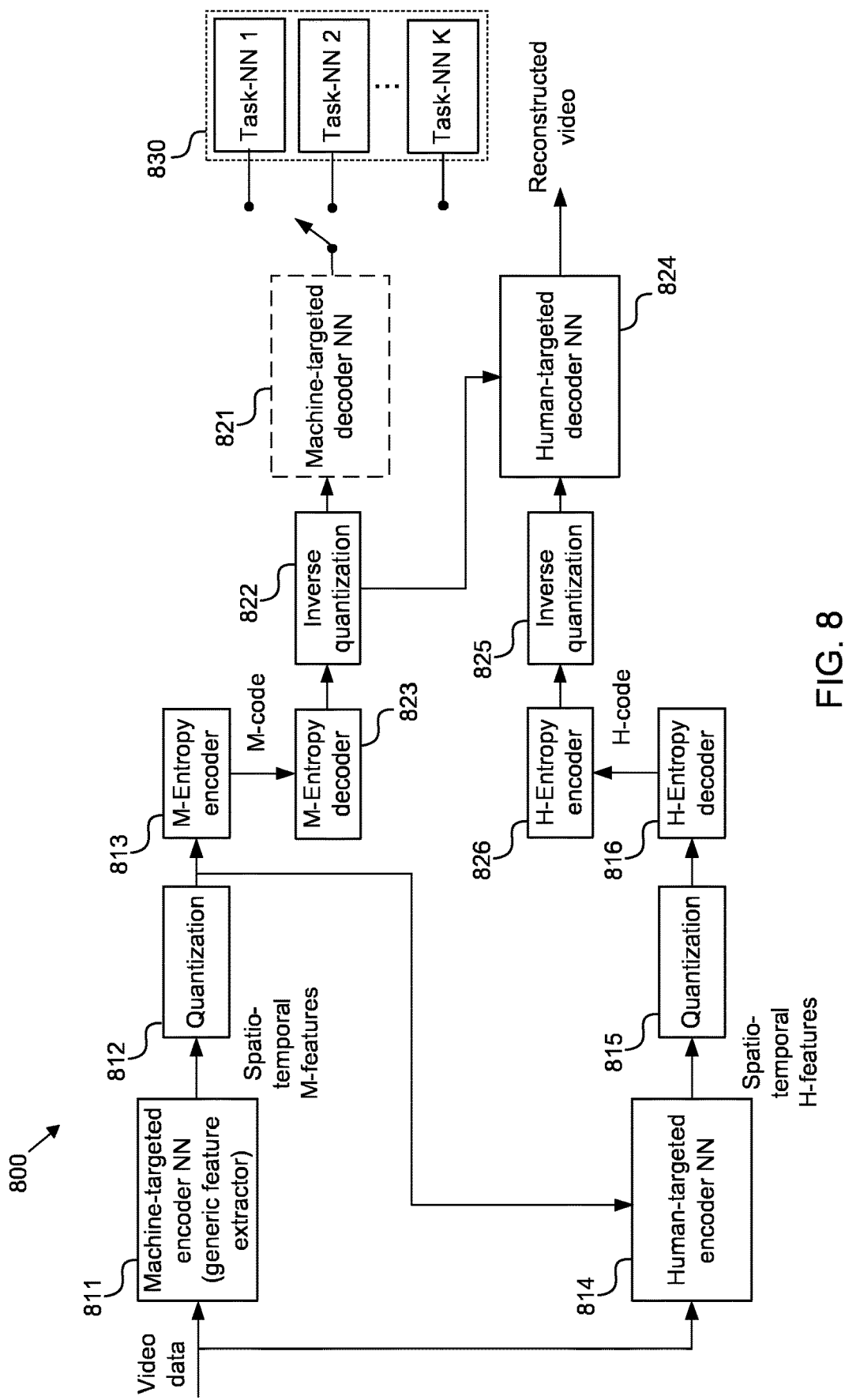
FIG. 8 illustrates another example of a video codec targeted for both machine and human consumption of video, according to an example embodiment.

FIG. 8 illustrates another example of a video codec targeted for both machine and human consumption of video, according to an example embodiment. Video codec 800 may comprise a first encoder neural network 811, which may comprise a machine-targeted encoder neural network. The first encoder neural network may operate as a generic feature extractor and be configured to output spatio-temporal machine-targeted features (M-features) based on input video data. The extracted spatio-temporal features may be quantized at a first quantization function 812. The video codec 800 may further comprise a first entropy encoder 813 configured to entropy encode the quantized M-features provided by the first quantization function 812. The output of the first entropy coder 813 may comprise the quantized and entropy encoded spatio-temporal M-features (M-code). The video codec 800 may further comprise a second encoder neural network 814, which may comprise a human-targeted encoder neural network. The second encoder neural network may be configured to output spatio-temporal human-targeted features (H-features) based on the input video data and optionally the quantized M-features provided by the first quantization function 812, as will be further described in relation to FIG. 9. If the quantized M-features are provided to the human-targeted encoder NN 814, an initial operation may comprise dequantizing the quantized M-features, applying a machine-targeted decoder NN (similar to 821) and then subtracting the dequantized M-features from the video data. Other suitable operations for reducing the amount of data by using the quantized M-features and the video data may be utilized. The extracted spatio-temporal features may be quantized at a second quantization function 815. The video codec 800 may further comprise a second entropy encoder 816 configured to entropy encode the quantized M-features provided by the second quantization function 815. The output of the second entropy coder 816 may comprise the quantized and entropy encoded spatio-temporal H-features (H-code). In another embodiment, the quantized M-features and the quantized H-features may be encoded by the same entropy encoder. The first and second encoder neural networks 811, 814, the first and second quantization functions 812, 815, and/or the first and second entropy encoders 813, 816, may form or be comprised at an encoder part of the codec 800. Operations of the first and second entropy encoders 813, 816 may be performed at a single entropy encoder. Operations of the first and second entropy decoders 823, 826 may be implemented in a single entropy decoder The video codec 800 may further comprise a first entropy decoder 823 configured to entropy decode an M-code received from the first entropy encoder 813, or another data source. The video codec 800 may further comprise a first inverse quantization function 822 configured to de-quantize the entropy decoded M-code. The video codec 800 may further comprise a first decoder neural network 821. The first decoder neural network may be a machine-targeted decoder neural network and be configured to decode the entropy decoded and de-quantized M-code. However, in another embodiment the video codec 800 may not comprise the first decoder neural network 821. The video codec 800 may further comprise a second entropy decoder 826 configured to entropy decode an H-code received from the first entropy encoder 816, or another data source. In another embodiment, the M-code and the H-code are both decoded by the same entropy-decoder. The video codec 800 may further comprise a second inverse quantization function 825 configured to de-quantize the entropy decoded H-code. The video codec 800 may further comprise a second decoder neural network 824. The second decoder neural network may be a human-targeted decoder neural network and be configured to decode the entropy decoded and de-quantized H-code. The second decoder neural network 824 may further receive as input the entropy decoded and de-quantized M-code from the first inverse quantization function 822. As discussed above, the decoder device 120 may already have some decoded information (e.g. the output of the inverse quantization 822), and therefore the human-targeted encoder NN 814 of the encoder device may provide only additional information. Thus, if the human-targeted encoder 814 has performed an initial step comprising a subtraction between the dequantized M-features and the original video, the human-targeted decoder NN 824 may first decode the dequantized H-features, and then add the decoded H-features to the dequantized M-features. In another embodiment, the second decoder neural network 824 may further receive as input the output of the machine-targeted decoder neural network 821. The first and second decoder neural networks 821, 824, the first and second inverse quantization functions 822, 825, and/or the first and second entropy decoders 823, 826, may form or be comprised at an decoder part of the codec 800. The encoder and decoder parts of the codec 800 may be embodied as a single codec, or separately for example at different devices or as separate software and/or hardware components.

The codec 800 may further comprise or be configured to be coupled to one or more machines, for example one or more task neural networks (task-NN) 830. During a development stage, for example when training the codec 800, the task-NNs may be representative of the task-NNs which will be used at an inference stage, for example when the codec 800, or parts thereof, are deployed and used for compressing and/or decompressing data. The task-NNs 830 may be pre-trained before the development stage. Furthermore, training data in a domain suitable to be input to the task-NNs may be obtained before the development stage. The training data may not be annotated, for example, the training data may not contain ground-truth labels.

Figure 9:
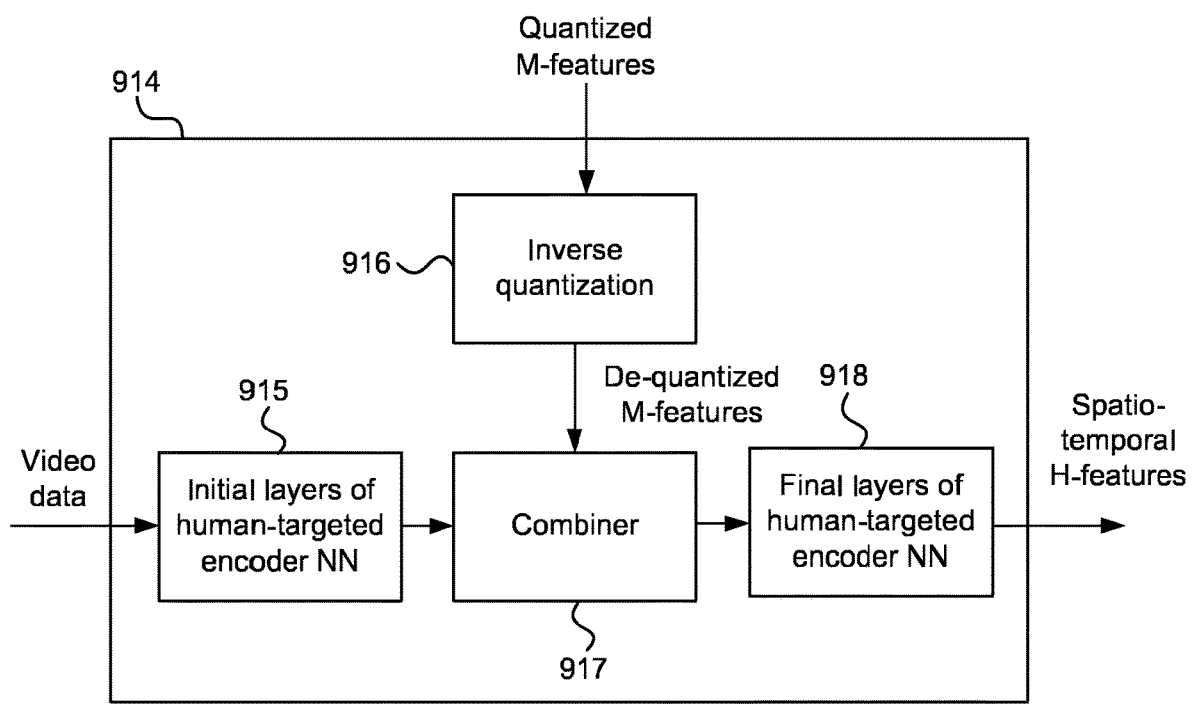
FIG. 9 illustrates an example of a human-targeted encoder neural network, according to an example embodiment.

FIG. 9 illustrates an example of a human-targeted encoder neural network, according to an example embodiment. As discussed above, the second encoder neural network 814 may comprise a human-targeted encoder neural network. Human-targeted encoder neural network 914 is provided as an example of the second encoder neural network 814. The human-targeted neural network 914 may process received video data with initial layers 915 of the human-targeted neural network 914. Furthermore, the human-targeted neural network 914 may comprise a de-quantization function 916 configured to de-quantize quantized M-features provided for example by the first quantization function 812. The human-targeted neural network 914 may further comprise a combiner 917, which may combine the de-quantized M-features with features extracted by the initial layers 915. The combiner may for example concatenate the de-quantized M-features with features extracted by the initial layers 915. Alternatively, the combiner 917 may first apply a machine-targeted decoder neural network similar to 821 on the dequantized M-features, and then concatenate the decoded M-features with features extracted by the initial layers 915. The output of the combiner 917 may be provided to the final layers 918 of the human-targeted neural network 914. The output of the human-targeted neural network 914 may comprise the spatio-temporal H-features output from the final layers 918.

Figure 10:
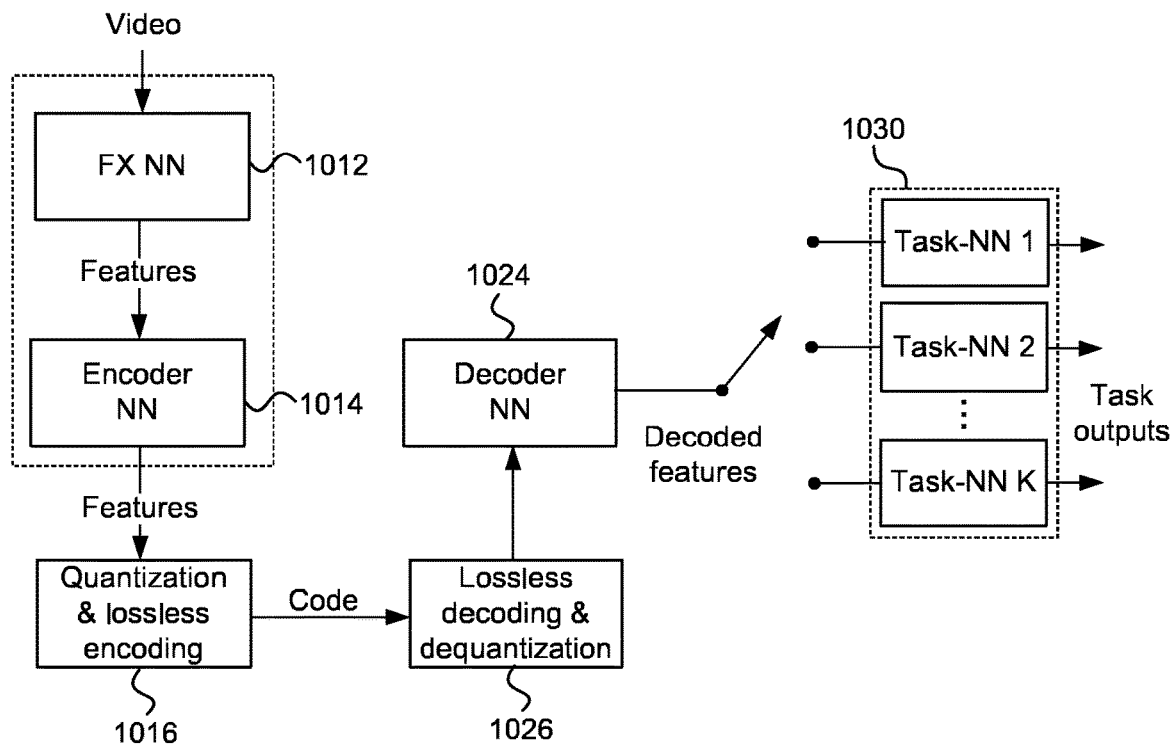
FIG. 10 illustrates an example of a coding pipeline, according to an example embodiment.

FIG. 10 illustrates an example of a coding pipeline, according to an example embodiment. The coding pipeline may comprise a feature extractor (FX) neural network 1012, which may be configured to extract features from input data. The coding pipeline may further comprise an encoder neural network 1014, for example the encoder network 611 of the auto-encoder 600. The encoder neural network 1014 may be configured to encode the features extracted by the FX neural network 1012. The coding pipeline may further comprise a decoder neural network 1024, for example the decoder network 621 of the auto-encoder 600, which may be configured to reconstruct the input data based on the output of the encoder neural network 1014. The coding pipeline may further comprise other functions such as for example quantization and/or lossless encoding 1016 and lossless decoding and/or dequantization function 1026. Data provided from the encoder neural network 1014 to the decoder neural network 1024 may be called a code, regardless of any additional functions between the encoder neural network 1014 to the decoder neural network. The decoded features output by the decoder neural network 1024 may be input to one or more task neural networks 1030 (Task-NN 1 to Task-NN K).

The FX neural network 1012 and the encoder neural network 1014 may be in some example embodiments considered as a single neural network. The FX neural network 1012 and the encoder neural network 1014 may be comprised in the encoder device 110. However, encoder device 100 may also comprise other functionality such as the decoder neural network 1024 and/or one or more task neural networks 1030, for example for training or fine-tuning the FX neural network 1012, the encoder neural network 1014, and/or the decoder neural network 1024. The encoder device 110 may further comprise the quantization and/or lossless encoding function 1016 and optionally the lossless decoding and/or dequantization function 1026. The decoder neural network 1024 may be comprised in decoder device 120. The decoder device 120 may further comprise the one or more task neural networks 1030. The one or more task neural networks 1030 may be however also located in another device. The decoder device 120 may further comprise the lossless decoding and/or dequantization function 1026, and an FX neural network 1012.

Figure 11:
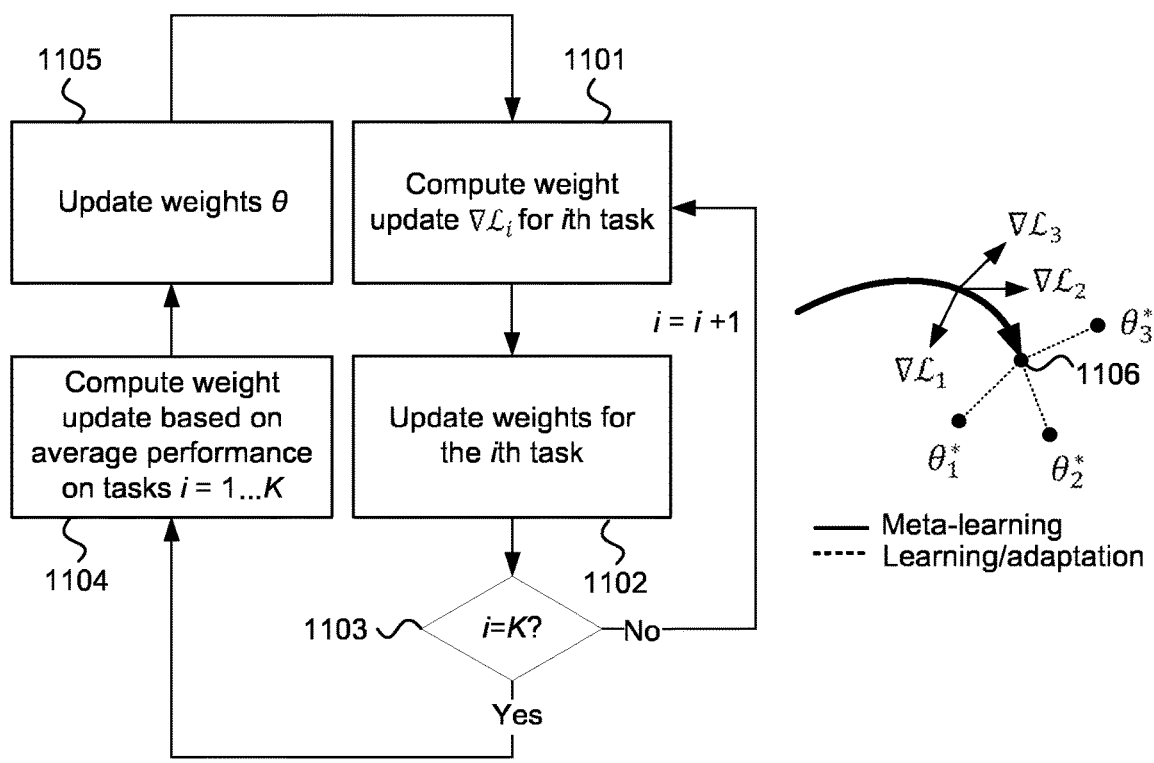
FIG. 11 illustrates an example of a method for training a coding pipeline in a development stage and a weight space associated with the development stage, according to an example embodiment.

FIG. 11 illustrates an example of a method for training a coding pipeline in a development stage and a weight space associated with the development stage, according to an example embodiment. A goal of the development stage may be to develop the encoder-side steps and the decoder-side steps such that compression rate is maximized and the performance of the task neural networks 1030 is maximized. At this stage, an apparatus responsible of the development phase may have access to a set of task neural networks 1030, which may not be exactly the same as the task neural network that are to be used at inference time. However, the task neural networks 1030 may be similar to the inference time networks, for example in terms of type of task (e.g. object classification, object detection, segmentation, action classification, object tracking, etc.) and/or architecture (e.g. type of layers such using residual layers, using convolutional layers, using fully-connected layers, number of layers), or the like. In general, the task neural networks 1030 available during development stage may be representative of the task neural networks which will be used at inference time. The task neural networks 1030 may be pretrained to perform their corresponding tasks.

The apparatus may have access to data in a domain suitable to be input to the task neural networks available at the development stage. This data may be annotated. For example, the data may contain ground-truth labels for at least one of the tasks associated with the task neural networks 1030. The FX neural network 1012, the encoder neural network 1014, and the decoder neural network 1024 may be pretrained.

The FX neural network 1012 may be trained based on minimizing a cost of fine-tuning the FX neural network 1012 to one or more specific tasks. Cost may refer to a number of fine-tuning iterations needed to achieve a sufficient performance on each specific task, for example according to a predetermined task-quality threshold or other suitable method to measure the task performance. For simplicity, the method is described for developing the FX neural network 1012. However, it is understood that the encoder neural network 1014 and/or the decoder neural network 1024 may be developed in a similar fashion, either simultaneously or separately.

The apparatus may develop the FX neural network 1012 according to an iterative procedure, where weight updates may be computed for each task i, i=1 . . . K, in an inner loop comprising operations 1101, 1102, and 1103, and where a weight update is computed and performed in an outer loop comprising operations 1104 and 1105 based on the average performance of all the tasks when using weights updated in the inner loop. Initially, the apparatus may obtain a data coding pipeline comprising the FX neural network 1012 configured to extract features from input data, the encoder neural network 1014 configured to encode the extracted features, and the decoder neural network 1024 configured to reconstruct the input data based on output of the encoder neural network 1014.

At 1101, the apparatus may compute a weight update $\nabla \mathcal{L}_i$ for an ith task.

At 1102, the apparatus may update weights of the FX neural network 1012 based on the weight update computed at 1101. The apparatus may further perform the ith task.

At 1103, the apparatus may determine whether i has reached the number of tasks K. The number of tasks K may be associated with a subset (or a batch) of all available tasks. The subset may be selected for example randomly. If i<K, the apparatus may initiate another iteration of the inner loop by increasing the value of i by i=i+1. Each iteration of the loop may consider one task from the subset of tasks. A weight-update may be computed with respect to the weights of the FX neural network 1012 before initiating the inner loop for the considered task i (θ). Updated weights ($θ_{new, i}$) may be obtained based on applying the weight update to the weights (θ). If the procedure has reached the last task, that is i=K, the apparatus may move to operation 1104 to compute a weight update based on average performance on tasks i=1 . . . K. This may be implemented for example based on meta-learning. An example of meta-learning based training is model agnostic meta-learning. For example, an average loss over the subset of tasks may be computed by using the respective updated weights ($θ_{new, i}$). A weight update may be then computed with respect to θ for example by differentiating the average loss.

FIG. 11 also illustrates a weight space associated with meta-learning with three tasks $\mathcal{L}_1$, $\mathcal{L}_2$ and $\mathcal{L}_3$. As discussed above, the inner loop may compute weight updates $\nabla\mathcal{L}_1$, $\nabla\mathcal{L}_2$ and $\nabla\mathcal{L}_3$ corresponding to each of the three tasks. The outer loop may compute an update of weights θ based on the average performance of the three tasks when using weights updated in the inner loop. If the FX neural network 1012 is considered as a point in the weight space, for example a Euclidean space where the axes are the weights or parameters of the FX neural network 1012, after the development stage the FX neural network 1012 may be at a point 1106 which is near the optimal points ($θ^*_1$, $θ^*_2$, $θ^*_3$) of each of the three task neural networks. Hence, the development stage provides a plurality of weights that are close to the desired weights of each of the plurality of tasks. A purpose of an adaptation (or learning) stage may be then to update the weights towards the optimal location on the weight space for one of the plurality of tasks.

Therefore, according to an example embodiment the apparatus may determine a plurality of losses for the coding pipeline, the plurality of losses corresponding to at least a plurality of tasks. The plurality of losses may comprise a plurality of task losses corresponding to a plurality of task neural networks 830. However, the plurality of losses may further comprise one or more compression losses, acting for example on the encoded and/or quantized and/or entropy coded features, for example the M-code and/or the H-code. The plurality of losses may comprise further losses such as for example a mean squared error (MSE) between decoded video or features and original video or features, respectively. The further losses may be applied to the loss used at the outer loop, for example added to the average loss from resulting from the inner loop. The apparatus may further determine a weight update for at least a subset of the coding pipeline based on the plurality of losses, the plurality of losses corresponding to at least the plurality of tasks. Additionally, the plurality of losses may comprise the further losses described above. The subset of the coding pipeline may comprise at least the FX neural network 1012. Alternatively, or additionally the subset of the coding pipeline may comprise the encoder neural network 1014 and/or the decoder neural network 1024. The apparatus may determine a weight update for at least the subset of the coding pipeline based on a plurality of weight updates corresponding to the plurality of tasks. The weight update may be configured to reduce a number of iterations for fine-tuning the coding pipeline for at least one of the plurality of tasks. Furthermore, the apparatus may update at least the subset of weights of the coding pipeline based on the weight update. The weight update may be determined based on an average performance of the plurality of tasks.

Figure 12:
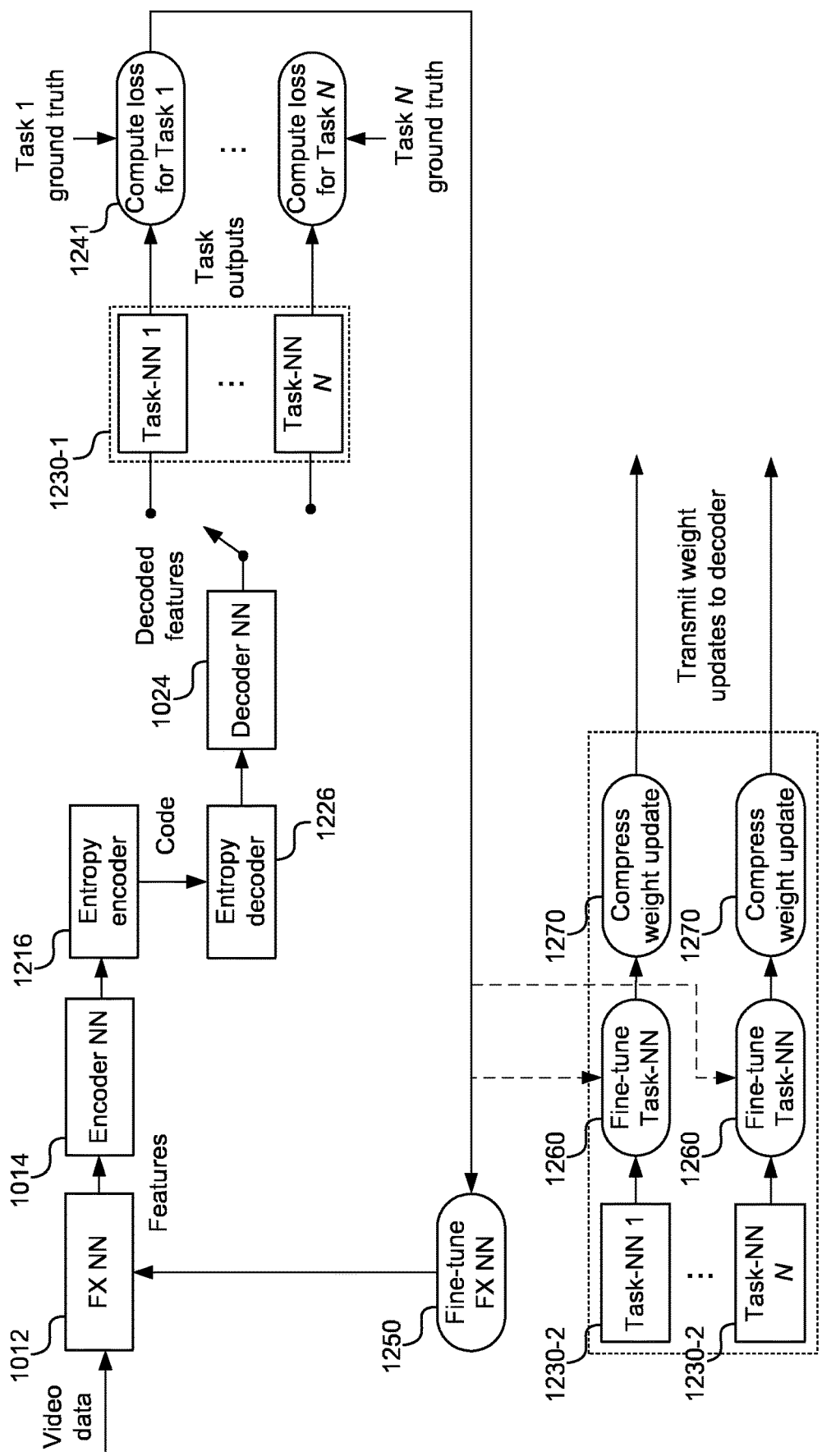
FIG. 12 illustrates an example of fine-tuning a coding pipeline in an adaptation stage, according to an example embodiment.

FIG. 12 illustrates an example of fine-tuning a coding pipeline in an adaptation stage, according to an example embodiment. At the adaptation stage, the FX neural network 1012, and optionally the encoder neural network 1014 and/or the plurality of task neural networks 1230-1, may be fine-tuned on the particular data domain or data characteristics, which will be used at inference stage. The adaptation stage may occur after deployment of the developed FX neural network 1012 and the encoder neural network 1014 at a device, for example encoder device 110, that needs to perform encoding of data. The device may for example comprise a camera for video surveillance. In that case, data acquired by a certain surveillance camera may be characterized by presence of shadows, natural content (e.g. trees, plants), or man-made content (e.g. buildings). Therefore, the developed FX neural network 1012 and the encoder neural network 1014 may be adapted for the characteristics of the data captured by the particular surveillance camera.

At the adaptation stage, the encoder device 110 may have access to one or more of the task neural networks 1230-1 which will be used at decoder device 120. Also, the encoder device 110 may have access to a dataset, which may be representative of the data that will be encoded during the inference stage. Since the FX neural network 1012 has been trained to reduce the needed fine-tuning iterations, the dataset may be smaller compared to the dataset used at development stage. This reduces the required memory space and power consumption during the adaptation stage. The dataset may contain also ground-truth information for the one or more task neural networks, which are available at the encoder device 110. At the adaptation stage the encoder device 110 may have access to the decoder neural network 1024, or a similar decoder neural network, used at decoder device 120.

The adaptation stage may comprise inputting data to the FX neural network 1012 and running the FX neural network 1012. The features extracted at the FX neural network 1012 may be processed by encoder neural network 1014, optionally followed by an entropy encoder 1216, to obtain a bitstream, or in general a code. The bitstream may be decoded at decoder neural network 1024, which may be preceded by an entropy decoder 1226. The decoded bitstream may be input to one or more task neural networks 1230-1. The encoder device 110 may then compute losses for each task based on the outputs of the available task neural networks 1230-1 and the ground-truth information. For example, at 1241, the encoder device may compute a loss for a first task based on an output of a first task neural network and ground-truth data for the first task. Similarly, a loss may be computed for each task k, where k=1 . . . N and where N is the number of task neural networks 1230 at the fine-tuning stage.

At 1250, the encoder device 110 may fine-tune the FX neural network 1012. The encoder device 110 may for example use the losses determined based on the tasks neural networks 1230-1 for updating the FX neural network 1012. Optionally, also the encoder neural network 1014 may be updated. Fine-tuning or updating operation of the FX neural network 1012 may be advantageously performed with only a few iterations, as the FX neural network 1012, encoder neural network 1014, and the decoder neural network 1024 are already close to the optimal points for the different tasks in the weight space. Fine-tuning may comprise determining a weight update based on the losses for tasks 1 to N and updating weights of the FX neural network 1012 and/or the encoder neural network 1014. The number of tasks considered in the fine-tuning stage, N, may or may not be equal to K, the number of tasks considered at the development stage. For example, at the development stage the FX neural network 1012 may be trained for many or all possible tasks. After development, the codec may be deployed at multiple devices, each device being associated with a subset of tasks. In some cases a device may consider only one task, for example.

Therefore, according to an example embodiment, the encoder device 110 may fine-tune the FX neural network 1012 based on a plurality of losses corresponding to at least the plurality of tasks. Furthermore, the encoder device 110 may fine-tune the encoder neural network 1014 based on the plurality of losses corresponding to at least the plurality of tasks. Furthermore, the encoder device 110 may fine-tune the encoder neural network 1014 based on the plurality of losses corresponding to at least the plurality of tasks. The plurality of losses may be computed based on outputs of the plurality of task neural networks and ground-truth data for the plurality of tasks. Fine-tuning the plurality of task neural networks may comprise fine-tuning the plurality of task neural networks based on outputs of the plurality of task neural networks and ground-truth data for the plurality of tasks.

According to an example embodiment, the encoder device 110 may additionally fine-tune also the task neural networks 1230-1 at the adaptation stage. The encoder device 110 may for example obtain a plurality of task neural networks 1230-2 that correspond to the plurality of task neural networks 1230-1.

At operations 1260, the encoder device 110 may fine-tune the task neural networks 1230-2 based on the plurality of losses computed based on outputs of the task neural networks 1230-1. The encoder device 110 may then fine-tune the plurality of task neural networks 1230-2 configured to perform the plurality of tasks based on the plurality of losses. Fine-tuning the plurality of task neural networks 1230-2 may be based on a compression term configured to reduce entropy of a plurality of weight updates associated with the plurality of task neural networks 1230-1. This plurality of weight updates may be different from the plurality of weight updates applied in the development phase and may be therefore referred to as a second plurality of weight updates. At the adaptation stage, fine-tuning the plurality of task neural networks 1230-2 may comprise fine-tuning the plurality of task neural networks 1230-2 based on the plurality of losses determined based on the outputs of the plurality of task neural networks 1230-1.

The compression term or loss of the training objective function may be for example selected such that it encourages the weight update to be represented using less bits. The compression term may estimate entropy of the weight update. Examples of compression terms include an L1 norm of the code, the L1 norm of the code divided by an L2 norm of the code, an approximation of entropy, and cross-entropy computed between an estimate of a probability of a next symbol of the code to be encoded and ground-truth next symbol. The latter may be a result of sampling a probability distribution, where parameters of the probability distribution may be estimated by a neural network. This example may be applied in relation to lossless coding based on arithmetic coding, where an arithmetic encoder and/or decoder may be provided with an input comprising the estimate of the probability of the next symbol to be encoded or decoded. A plurality of compression terms may be applied, for example one compression term for each task neural network 1230-1, or alternatively a single compression term for the plurality of task neural networks 1230-1.

During the adaptation stage, the extracted features may be updated only slightly, because the FX neural network 1012 needs to be updated only slightly. As a result, the task neural networks 1230-2 may be updated only slightly too. However, the data size of the weight update, which may comprise the number of bits needed to represent the weight update, may also depend on how much the input data used for the fine-tuning in the adaptation stage differs from the data used during the development stage At 1270, the encoder device 110 may compress the weight updates for the task neural networks 1230-2. The encoder device 110 may transmit the plurality of weight updates associated with the task neural networks 1230-2 to the decoder device 120. Alternatively, or additionally, the weight updates may be transmitted to at least one client encoder device 112. The decoder device 120 and/or the client encoder device(s) 112 may use the weight update for updating their corresponding task neural networks.

As discussed above, the encoder device 110 may be configured to operate as a master encoder device. The data coding system 100 may comprise several encoder devices 110, 112 which share a common data domain, or properties of the data on which the FX neural network 1012 will run, for example multiple surveillance camera devices used in nearby areas. However, some of these devices may not have capabilities or resources for running the fine-tuning operations. Therefore, devices with limited capabilities may be configured to operate as client encoder devices 112, which may take advantage of the fine-tuning capabilities of the (master) encoder device 110, or a plurality of master encoder devices.

A master encoder device may be in charge of performing the fine-tuning operations as described herein. A result of the fine-tuning may comprise a weight update. The weight update may be then shared between the devices. For example, the encoder device 110 may transmit the weight updates to at least one client encoder device 112. The client encoder device(s) 112 may use the weight updates for updating the corresponding task neural networks at the client encoder device(s) 112.

Figure 13:
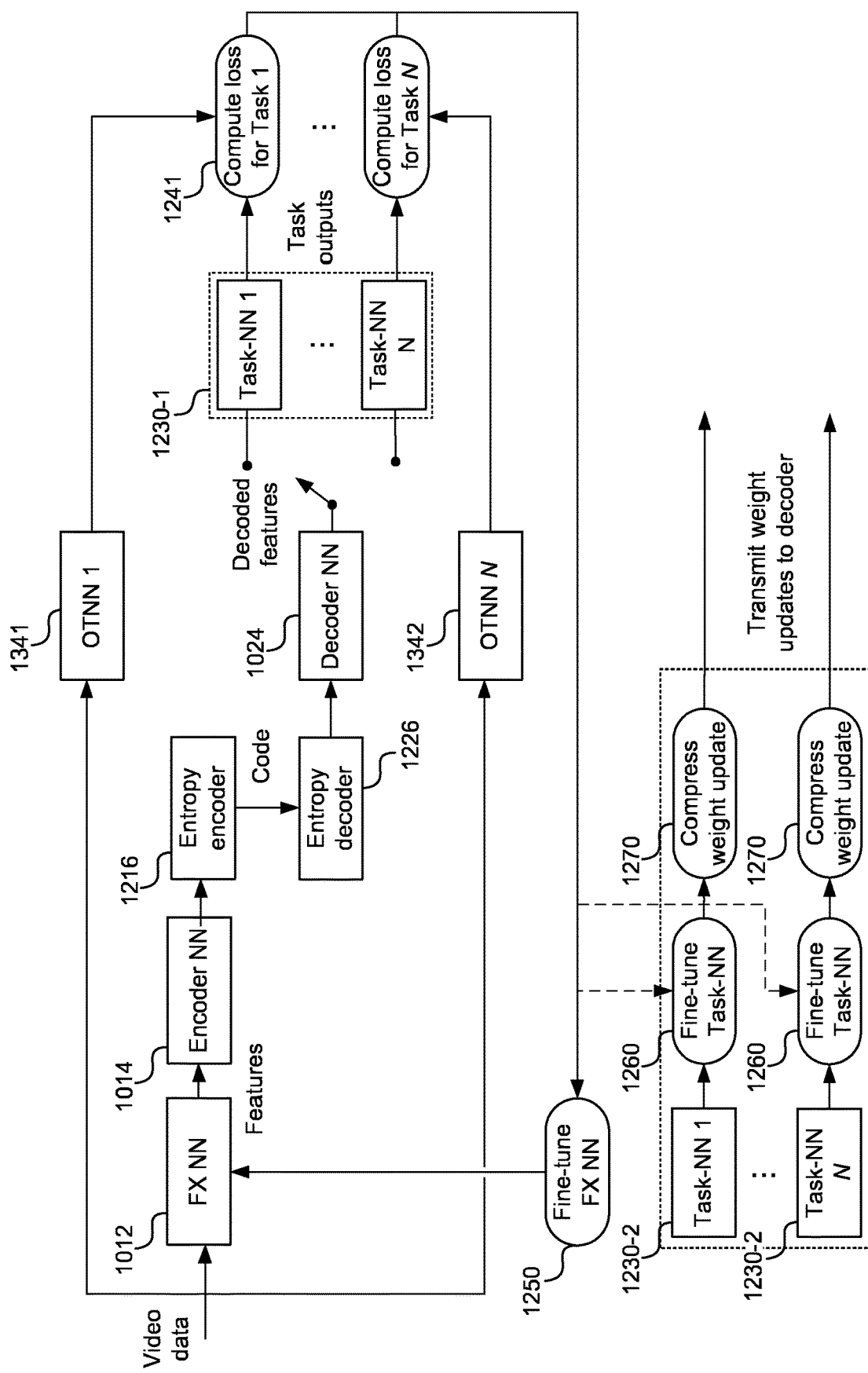
FIG. 13 illustrates an example of fine-tuning a coding pipeline in an inference stage, according to an example embodiment.

FIG. 13 illustrates an example of fine-tuning a coding pipeline in an inference stage, according to an example embodiment. In the inference stage, encoder device 110 may receive input data for encoding, extract features from the input data, encode the extracted features at least with the encoder neural network 1014 to obtain an encoded bitstream, and/or transmit the encoded bit stream to the decoder device 120. The inference stage may comprise a feature extraction step, for example by FX neural network 1012. The decoded data at decoder device 120 may comprise decoded features and therefore the input to the task neural networks of the decoder device 120 may comprise decoded features. The task neural networks 1230-1 may have been modified from original task neural networks 1 to N (OTNN n) 1341, 1342. The OTNNs may have been trained on the original data, for example video, instead of features extracted from the original data. Thus, the task neural networks may comprise modified versions of the OTNNs such that that they can accept features as input. Such modifications may for example include removing a set of initial layers and/or fine-tuning weights of the remaining layers. However, the OTNNs may be modified to accept extracted features in any suitable manner. The encoder device 110 may have access to the OTNNs. The encoder device 110 may further have access to decoder neural network 1024, which may be similar to a decoder neural network deployed at the decoder device 120. The encoder device 110 may have access to task neural networks 1230-1, which may be similar to those used on the decoded data at the decoder device 120. The OTNNs 1 to N 1341, 1342 may be also referred to as reference task neural networks.

According to an example embodiment, the encoder device 110 may compute the plurality of losses based on outputs of the plurality of task neural networks and outputs of a plurality of reference neural networks configured to perform the plurality of tasks based on the input data. For example, video data may be provided as input data to the FX neural network 1012 and the OTNNs 1 to N 1314, 1342. Outputs of the OTNNs may be considered as ground-truth results. The FX neural network 1012 may output features. These features may be processed by encoder neural network 1014, quantizer, entropy encoder 1216, de-quantizer, entropy decoder 1226, and/or decoder neural network 1024, for example similar to FIG. 12. The decoded features output by the decoder neural network 1024 may be input to the task neural networks 1230-1.

A plurality of losses may be then computed based on outputs of the OTNNs 1 to N 1341, 1342 and the outputs of the task neural networks 1230-1. These losses may be used at 1250 to iteratively update the FX neural network 1012. This fine-tuning process is likely to require very few iterations, as the FX neural network 1012 is already near to the optimal point for the considered task neural networks 1230-1 in the weight space. This reduces the time for fine-tuning the FX neural network during the inference phase, where it may be desired to quickly fine-tune the coding pipeline to the currently used input data.

According to an example embodiment, the encoder device 110 may fine-tune also the task neural networks at the inference stage. Fine-tuning the task neural networks may comprise obtaining task neural networks 1230-2 similar to task neural networks 1230-1, fine-tuning (1260) the task neural networks, and compressing and/or transmitting (1270) the weight updates to the decoder device 120, for example similar to FIG. 12. However, contrary to FIG. 12, fine-tuning the plurality of task neural networks at the inference stage may comprise fine-tuning the plurality of task neural networks based on the plurality of losses computed based on outputs of the plurality of reference neural networks (OTNNs) and the outputs of the plurality of task neural networks 1230-1.

Figure 14:
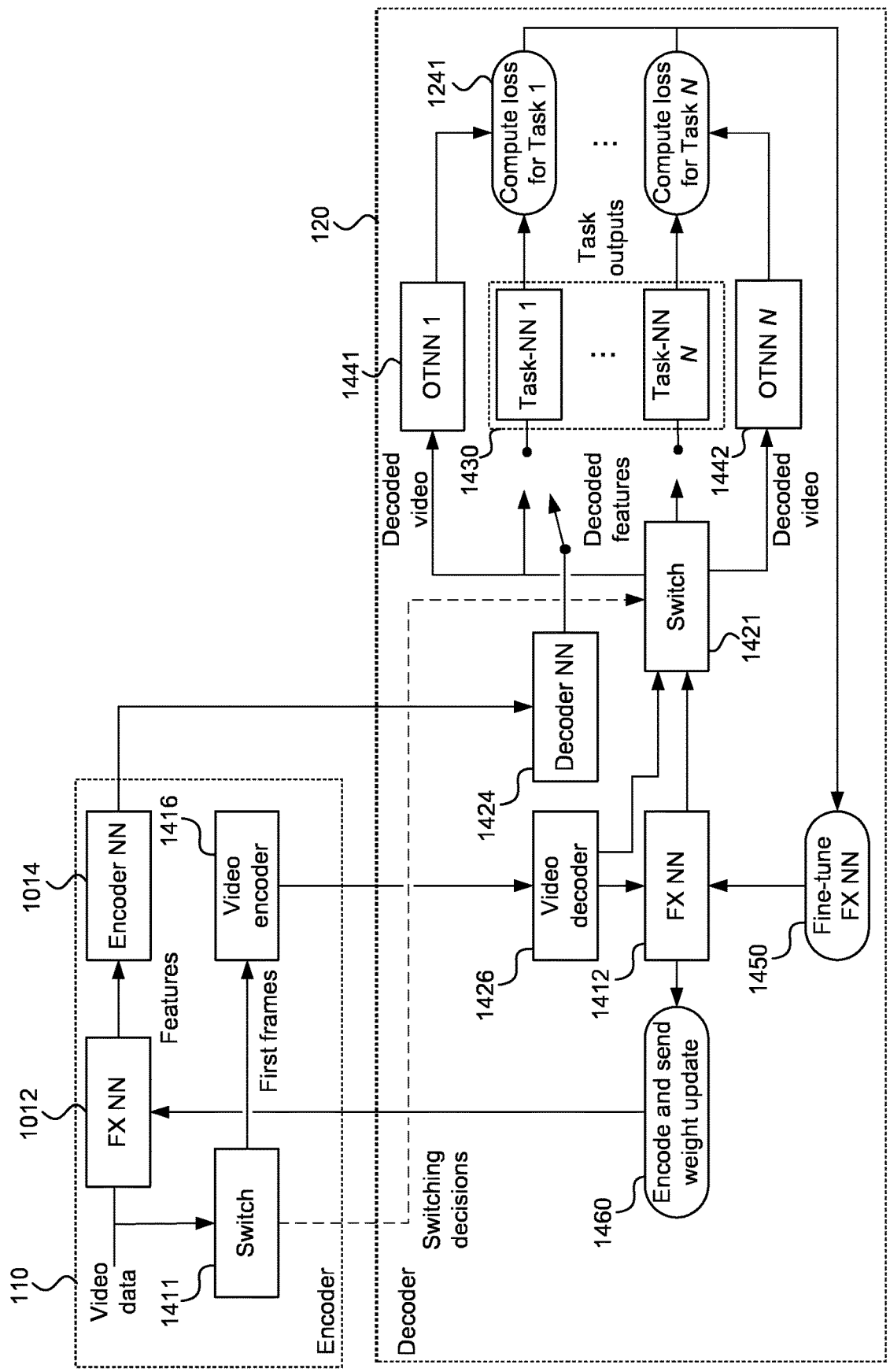
FIG. 14 illustrates an example of fine-tuning a feature extractor neural network at a decoder in an inference stage, according to an example embodiment.

FIG. 14 illustrates an example of fine-tuning a feature extractor neural network at a decoder in an inference stage, according to an example embodiment. At inference stage, the decoder device may know or be informed of a pre-trained FX neural network 1012 that is used at the encoder device 110. For example, the encoder device may transmit an identifier of the FX neural network 1012, or the FX neural network 1012 itself, to the decoder device 120.

The encoder device 110 may further comprise an encoder neural network 1014 configured to encode the features extracted by FX neural network 1012. The encoder device 110 may further comprise a video encoder 1416. The video encoder 1416 may comprise an non-learned video encoder (such as a video encoder compliant with an international standard such as H.266) or a video encoder neural network. In case of video encoder neural network the video encoder 1416 may further comprise quantization and lossless encoding. The encoder device 110 may further comprise a switch 1411 which may be used to determine which video frames are to be encoded by video encoder 1416. For example, the switch may be activated for at least one initial frame and/or for at least one subsequent frame of a video stream or a video file, for example every N frames, to pass a subset of video frames to the video encoder 1416. The encoder device 110 may encode the subset of frames with the video encoder 1416. In general, the encoder device 110 may encode at least one portion of the input data. The portion may comprise a subset of video frames, for example the at least one initial frame and/or at least one subsequent frame. The encoder device 110 may further transmit the encoded at least one portion of the data to the decoder device 120. The video encoder 1416 may encode the video frames with a sufficiently high quality, for example using a quantization parameter that is lower than or equal to a threshold. The encoder device 110 may further transmit an indication of switching decision(s) to the decoder device 120, for example to enable switch 1421 of the decoder device 120 to operate according to switching decisions done at the encoder device 110.

The encoder device 110 may also encode, by the encoder neural network 1014, the features extracted by the FX neural network 1012 from the input data. The input data may comprise a normal quality video, for example video data encoded and decoded at a quality which may be used after fine-tuning the FX neural network 1412 of the decoder device 120.

The decoder device 120 may receive the encoded features of the input data, provided for example by the encoder neural network 1014 of the encoder device 110. The decoder device 120 may further determine, by a decoder neural network 1424, decoded features based on the encoded features received from the encoder device 110. The decoder device 120 may further perform a plurality of tasks with a plurality of task neural networks 1430 based on the decoded features. For example, the decoded features may be input to the task neural networks 1430.

The decoder device 120 may further receive the at least one encoded portion of the input data, for example the encoded subset of video frames provided by video encoder 1416. The decoder device 120 may decode the at least one encoded portion of the input data. For example, video decoder 1426 may decode the subset of video frames provided by video encoder 1416. In a first example, the decoded video may be provided to the OTNNs 1 to N, for example through switch 1421. In a second example, the decoder device 120 may extract features from the decoded portion of the input data by FX neural network 1412. For example, the decoded video frames may be input to the FX neural network 1412. The features extracted from the decoded video frames may be provided to the task neural networks 1430, for example through the switch 1421.

The decoder device may perform the plurality of tasks with a plurality of reference task neural networks (OTNNs) based on the decoded video. In the first example, outputs of the OTNNs may be considered as ground-truth data for respective task neural networks. The decoder device 120 may for example determine a plurality of losses based on outputs of the plurality of task neural networks and outputs of the plurality of reference task neural networks. For example, the losses may be computed by using the outputs of the OTNNs 1 to N 1441, 1442 and of the task neural networks 1430. In the second example, the losses may be computed based on the outputs of the task neural networks 1430, when their input is either the features extracted from the decoded video or the decoded features. The losses may be used to fine-tune the FX neural network 1412 at the decoder device 120. For example, at 1450 the decoder device 120 may determine a weight update based on the plurality of losses and fine-tune the FX neural network 1412 based on the weight update. A compression loss on the weight update of the FX neural network 1412 may be used during the fine-tuning.

At 1460, the decoder device 120 may further compress the weight update and/or transmit the weight update to the encoder device 110. The encoder device 110 may use the received weight update to update its FX neural network 1012. Subsequent video frames may be processed by the updated FX neural network 1012. An advantage of this example embodiment is that the encoder device 110 does not need to know the task neural networks 1430. For example, in some cases it may not be feasible for the encoder device 110 to have availability of the task neural networks 1430.

Figure 15:
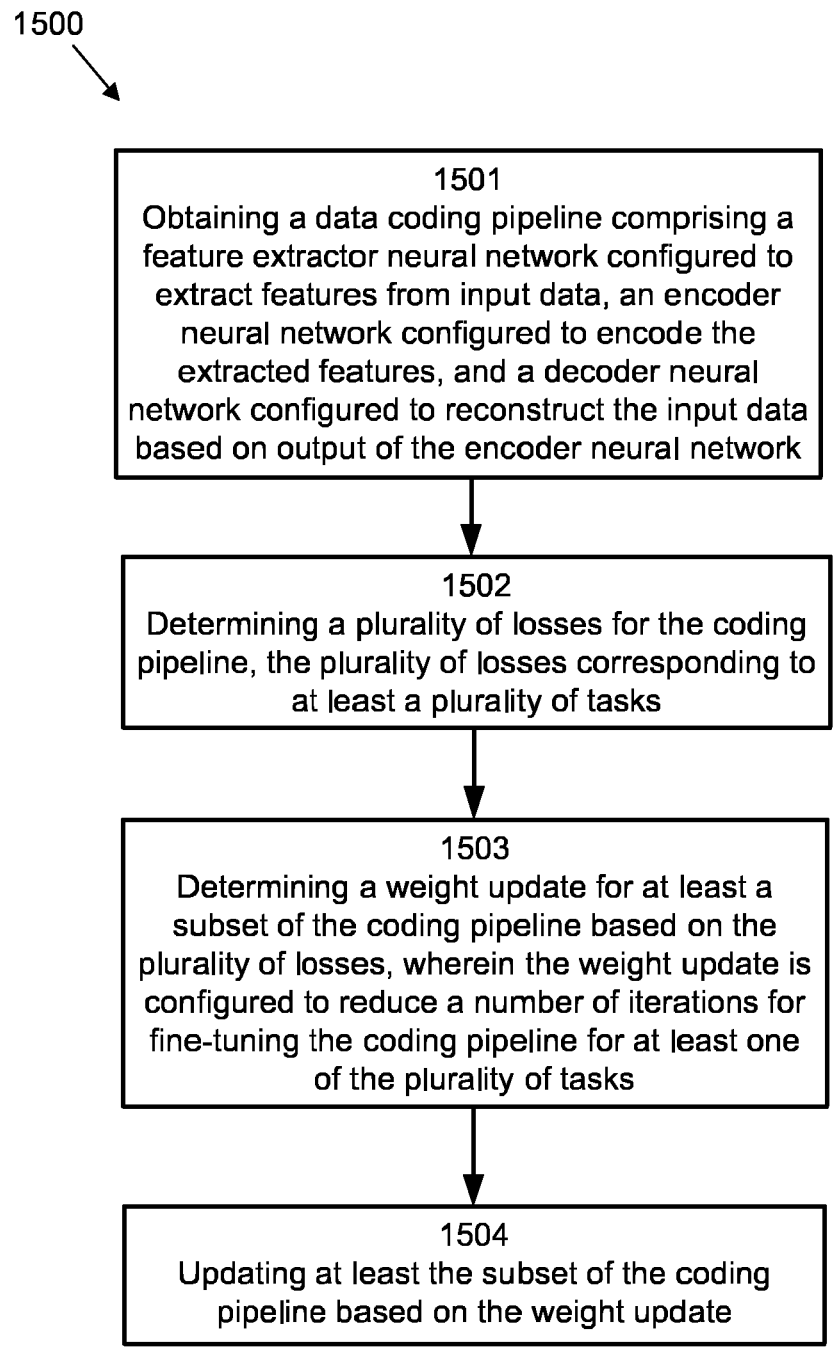
FIG. 15 illustrates an example of a method for training a data coding pipeline at an encoder device, according to an example embodiment.

FIG. 15 illustrates an example of a method 1500 for training a data coding pipeline at an encoder device, according to an example embodiment.

At 1501, the method may comprise obtaining a data coding pipeline comprising a feature extractor neural network configured to extract features from input data, an encoder neural network configured to encode the extracted features, and a decoder neural network configured to reconstruct the input data based on output of the encoder neural network.

At 1502, the method may comprise determining a plurality of losses for the coding pipeline, the plurality of losses corresponding to at least a plurality of tasks.

At 1503, the method may comprise determining a weight update for at least a subset of the coding pipeline based on the plurality of losses, wherein the weight update is configured to reduce a number of iterations for fine-tuning the coding pipeline for at least one of the plurality of tasks.

At 1504, the method may comprise updating at least the subset of the coding pipeline based on the weight update.

The updated coding pipeline, or a subset thereof, may be stored on a memory or transmitted to another device for use in data encoding, for example video compression, image compression, audio compression, or the like.

Figure 16:
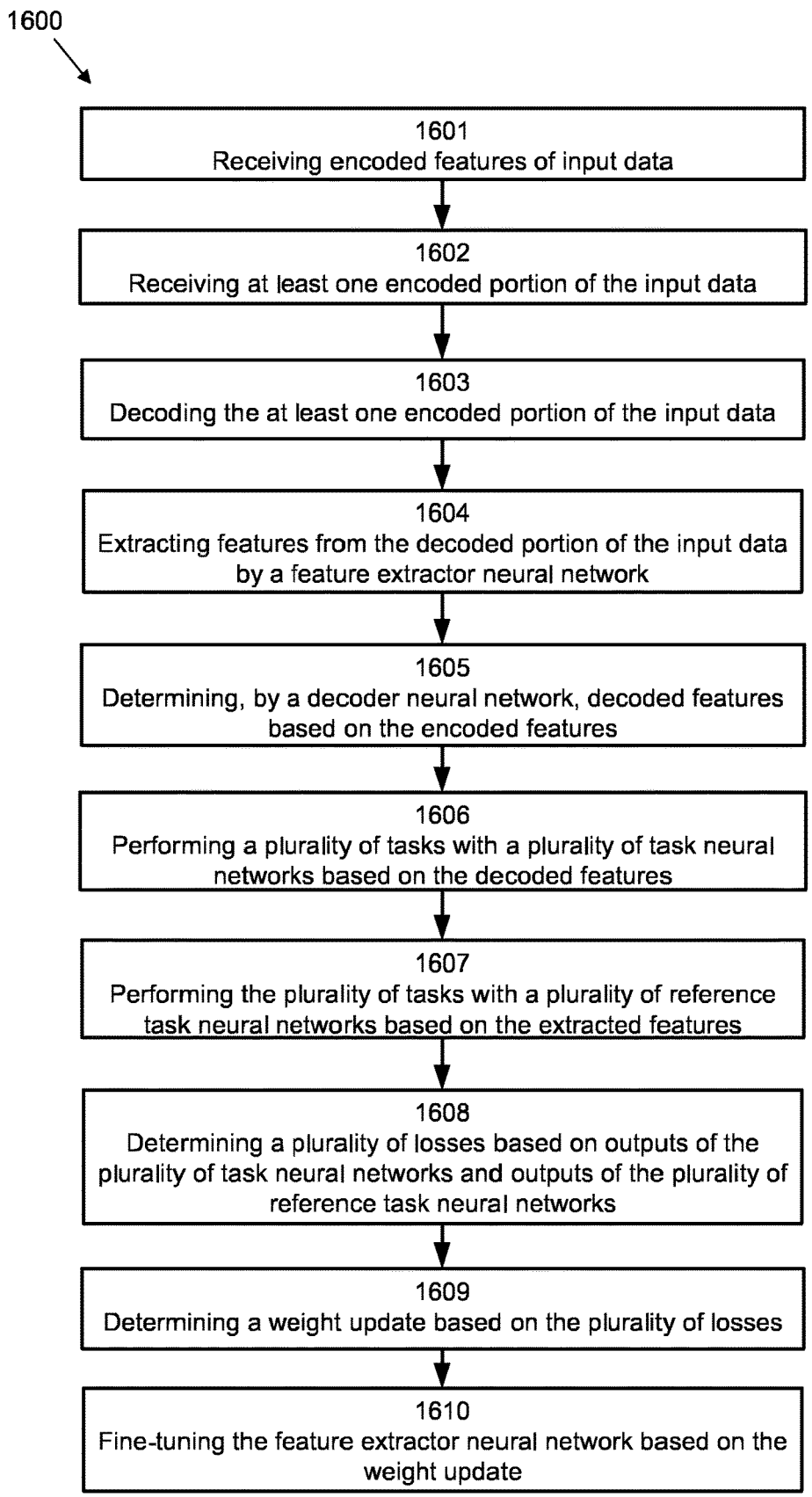
FIG. 16 illustrates an example of a method for training a data coding pipeline at a decoder device, according to an example embodiment.

FIG. 16 illustrates an example of a method 1600 for training a data coding pipeline at a decoder device, according to an example embodiment.

At 1601, the method may comprise receiving encoded features of input data.

At 1602, the method may comprise receiving at least one encoded portion of the input data.

At 1603, the method may comprise decoding the at least one encoded portion of the input data.

At 1604, the method may comprise extracting features from the decoded portion of the input data by a feature extractor neural network.

At 1605, the method may comprise determining, by a decoder neural network, decoded features based on the encoded features.

At 1606, the method may comprise performing a plurality of tasks with a plurality of task neural networks based on the decoded features.

At 1607, the method may comprise performing the plurality of tasks with a plurality of reference task neural networks based on the extracted features.

At 1608, the method may comprise determining a plurality of losses based on outputs of the plurality of task neural networks and outputs of the plurality of reference task neural networks.

At 1609, the method may comprise determining a weight update based on the plurality of losses.

At 1610, the method may comprise fine-tuning the feature extractor neural network based on the weight update.

The fine-tuned feature extractor network may be stored on a memory or transmitted to another device for use in data decoding, for example video decompression, image decompression, audio decompression, or the like.

Further features of the methods directly result for example from the functionalities and parameters of the encoder device 110 and/or the decoder device 120, as described in the appended claims and throughout the specification, and are therefore not repeated here. It is noted that one or more steps of the method may be performed in different order.

An apparatus, for example encoder device 110 or decoder device 120 may be configured to perform or cause performance of any aspect of the method(s) described herein. Further, a computer program may comprise instructions for causing, when executed, an apparatus to perform any aspect of the method(s) described herein. Further, a computer program may comprise instructions for causing, when executed, an apparatus to perform any aspect of the method(s) described herein. Further, a computer program product or a computer readable medium may comprise program instructions for causing an apparatus to perform any aspect of the method(s) described herein. Further, an apparatus may comprise means for performing any aspect of the method(s) described herein. According to an example embodiment, the means comprises at least one processor, and memory including program code, the at one memory and the program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. Furthermore, references to 'at least one' item or 'one or more' items may refer to one or a plurality of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
at least one processor; and
at least one memory storing instructions that, when executed by the at least one processor, cause the apparatus to:
obtain a data coding pipeline comprising a feature extractor neural network configured to extract features from input data, an encoder neural network configured to encode extracted features from the feature extractor neural network, and a decoder neural network configured to reconstruct the input data based on output of the encoder neural network;
determine a plurality of losses for the coding pipeline, the plurality of losses corresponding to at least a plurality of tasks;
determine a weight update for at least a subset of the coding pipeline based on the plurality of losses, wherein the weight update is configured to reduce a number of iterations for fine-tuning the coding pipeline for at least one of the plurality of tasks; and
update at least the subset of the coding pipeline based on the weight update.

2. The apparatus according to claim 1, wherein the at least one memory further stores instructions that, when executed by the at least one processor, a cause the apparatus to:
determine the weight update based on an average performance of the plurality of tasks.

3. The apparatus according to claim 1, wherein the at least one memory further stores instructions that, when executed by the at least one processor, a cause the apparatus to:
receive the input data for encoding;
extract features form the input data;
encode the extracted features with at least the encoder neural network to obtain an encoded bitstream; and
transmit the encoded bitstream to a decoder device.

4. The apparatus according to claim 1, wherein the at least one memory further stores instructions that, when executed by the at least one processor, a cause the apparatus to:
fine-tune the feature extractor neural network based on the plurality of losses corresponding to at least the plurality of tasks.

5. The apparatus according to claim 4, wherein the at least one memory further stores instructions that, when executed by the at least one processor, a cause the apparatus to:
fine-tune the encoder neural network based on the plurality of losses corresponding to at least the plurality of tasks.

6. The apparatus according to claim 4, wherein the at least one memory further stores instructions that, when executed by the at least one processor, a cause the apparatus to:
fine-tune a plurality of task neural networks configured to perform the plurality of tasks based on the plurality of losses.

7. The apparatus according to claim 6, wherein fine-tuning the plurality of task neural networks is based on a compression term configured to reduce entropy of a second plurality of weight updates associated with the plurality of task neural networks.

8. The apparatus according to claim 7, wherein the at least one memory further stores instructions that, when executed by the at least one processor, a cause the apparatus to:
compress the second plurality of weight updates; and/or
transmit the second plurality of weight updates to a decoder device or at least one client encoder device.

9. The apparatus according to claim 4, wherein the at least one memory further stores instructions that, when executed by the at least one processor, a cause the apparatus to:
determine the plurality of losses based on outputs of a plurality of task neural networks and ground-truth data for the plurality of tasks.

10. The apparatus according to claim 4, wherein the at least one memory further stores instructions that, when executed by the at least one processor cause the apparatus at least to:
compute the plurality of losses based on outputs of a plurality of task neural networks and outputs of a plurality of reference neural networks configured to perform the plurality of tasks based on the input data.

11. The apparatus according to claim 1, wherein the at least one memory further stores instructions that, when executed by the at least one processor, a cause the apparatus to:
encode at least one portion of the input data; and
transmit the encoded at least one portion of the data to a decoder device.

12. An apparatus, comprising:
at least one processor; and
at least one memory including storing instructions that, when executed by the at least one processor, cause the apparatus to perform:
receive encoded features of input data;
receive at least one encoded portion of the input data;
decode the at least one encoded portion of the input data to form a decoded portion of the input data;
extract features from the decoded portion of the input data with a feature extractor neural network;
determine, with a decoder neural network, decoded features based on the encoded features;
perform a plurality of tasks with a plurality of task neural networks based on the decoded features;
perform the plurality of tasks with a plurality of reference task neural networks based on the extracted features, wherein the plurality of task neural networks are independent of the plurality of reference task neural networks;

determine a plurality of losses based on outputs of the plurality of task neural networks and outputs of the plurality of reference task neural networks;

determine a weight update based on the plurality of losses; and fine-tune the feature extractor neural network based on the weight update, wherein the weight update is configured to reduce a number of iterations for the fine-tuning.

13. The apparatus according to claim 12, wherein the at least one memory further stores instructions that, when executed by the at least one processor, cause the apparatus to:

compress the weight update; and/or transmit the weight update to an encoder device.

14. A method, comprising:

obtaining a data coding pipeline comprising a feature extractor neural network configured to extract features from input data, an encoder neural network configured to encode extracted features from the feature extractor neural network, and a decoder neural network configured to reconstruct the input data based on output of the encoder neural network;

determining a plurality of losses for the coding pipeline, the plurality of losses corresponding to at least a plurality of tasks;

determining a weight update for at least a subset of the coding pipeline based on the plurality of losses, wherein the weight update is configured to reduce a number of iterations for fine-tuning the coding pipeline for at least one of the plurality of tasks; and updating at least the subset of the coding pipeline based on the weight update.

15. The method according to claim 14, further comprising:

fine-tuning the feature extractor neural network based on the plurality of losses corresponding to at least the plurality of tasks.

16. The method according to claim 15, further comprising:

determining the plurality of losses based on outputs of a plurality of task neural networks and ground-truth data for the plurality of tasks.

17. The method according to claim 15, further comprising:

computing the plurality of losses based on outputs of a plurality of task neural networks and outputs of a plurality of reference neural networks configured to perform the plurality of tasks based on the input data.

18. A method, comprising:

receiving encoded features of input data;

receiving at least one encoded portion of the input data;

decoding the at least one encoded portion of the input data to form a decoded portion of the input data;

extracting features from the decoded portion of the input data with a feature extractor neural network;

determining, with a decoder neural network, decoded features based on the encoded features;

performing a plurality of tasks with a plurality of task neural networks based on the decoded features;

performing the plurality of tasks with a plurality of reference task neural networks based on the extracted features, wherein the plurality of task neural networks are independent of the plurality of reference task neural networks;

determining a plurality of losses based on outputs of the plurality of task neural networks and outputs of the plurality of reference task neural networks;

determining a weight update based on the plurality of losses; and fine-tuning the feature extractor neural network based on the weight update, wherein the weight update is configured to reduce a number of iterations for the fine-tuning.

19. A non-transitory computer readable medium comprising program instructions that, when executed with an apparatus, cause the apparatus to perform at least the method as claimed in claim 14.

20. A non-transitory computer readable medium comprising program instructions that, when executed with an apparatus, cause the apparatus to perform at least the method as claimed in claim 18.

* * * * *